United States Patent
Maeda

(10) Patent No.: US 9,069,834 B2
(45) Date of Patent: Jun. 30, 2015

(54) CONTROL METHOD AND STORAGE CONTROLLER APPARATUS

(71) Applicant: FUJITSU LIMITED, Kawasaki-shi (JP)

(72) Inventor: Mihoko Maeda, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 237 days.

(21) Appl. No.: 13/751,561

(22) Filed: Jan. 28, 2013

(65) Prior Publication Data

US 2013/0262383 A1    Oct. 3, 2013

(30) Foreign Application Priority Data

Mar. 29, 2012    (JP) ................... 2012-075374

(51) Int. Cl.
*G06F 17/30*    (2006.01)
*G06F 11/20*    (2006.01)

(52) U.S. Cl.
CPC ...... *G06F 17/30575* (2013.01); *G06F 11/2082* (2013.01); *G06F 11/2089* (2013.01); *G06F 11/2094* (2013.01); *Y10S 707/99952* (2013.01); *G06F 17/30578* (2013.01)

(58) Field of Classification Search
CPC .......... G06F 13/30575; G06F 11/2082; G06F 11/2089; G06F 11/2094; Y10S 707/99952
USPC .................................. 707/634, 610
See application file for complete search history.

(56) References Cited

U.S. PATENT DOCUMENTS

| | | | |
|---|---|---|---|
| 6,598,174 B1 * | 7/2003 | Parks et al. ................... | 714/6.22 |
| 6,694,350 B2 * | 2/2004 | Kurashima et al. ........... | 709/203 |
| 7,424,549 B2 * | 9/2008 | Beckwith ..................... | 709/238 |
| 7,539,824 B2 * | 5/2009 | Lolayekar et al. ............ | 711/148 |
| 7,558,926 B1 * | 7/2009 | Oliveira et al. ............... | 711/161 |
| 7,836,429 B2 * | 11/2010 | Clemm et al. ................ | 717/121 |
| 7,945,750 B2 * | 5/2011 | Arakawa et al. .............. | 711/162 |
| 7,966,285 B2 * | 6/2011 | Sawadsky et al. ............ | 707/610 |
| 8,090,681 B2 * | 1/2012 | Lukiyanov et al. ........... | 707/609 |
| 8,171,171 B2 * | 5/2012 | Kim et al. ..................... | 709/248 |
| 8,281,033 B1 * | 10/2012 | Riordan et al. ............... | 709/238 |

(Continued)

FOREIGN PATENT DOCUMENTS

| | | |
|---|---|---|
| JP | 11-168505 | 6/1999 |
| JP | 2008-299481 | 12/2008 |

OTHER PUBLICATIONS

E.W. Dijkstra, "A Note on Two Problems in Connexion with Graphs", Numerische Mathematik 1, Jun. 11, 1959, pp. 269-271.

*Primary Examiner* — Phuong Thao Cao
(74) *Attorney, Agent, or Firm* — Staas & Halsey LLP

(57) ABSTRACT

A control method executed by a first storage control apparatus comprises receiving, from the information processing apparatus, a request to change data stored in a storage unit provided in the first storage control apparatus so as to be synchronized to changed data, extracting address information, included in the request, that identifies an address at which data corresponding to the data to be synchronized has been stored in a storage unit provided in the second storage control apparatus, creating time information that identifies a time of the day at which the request was received, and transmitting a change request, which includes the extracted address information and the created time information, from the first storage control apparatus to the second storage control apparatus, the change request requesting the corresponding data stored in the second storage control apparatus to be changed to the changed data.

12 Claims, 18 Drawing Sheets

(56) References Cited

U.S. PATENT DOCUMENTS

| | | | |
|---|---|---|---|
| 8,285,824 B2* | 10/2012 | Kodama et al. | 709/221 |
| 8,341,114 B2* | 12/2012 | Mast et al. | 707/610 |
| 8,572,026 B2* | 10/2013 | Vedula | 707/610 |
| 8,825,597 B1* | 9/2014 | Houston et al. | 707/610 |
| 2004/0059882 A1* | 3/2004 | Kedem et al. | 711/162 |
| 2006/0036825 A1* | 2/2006 | Maki et al. | 711/165 |
| 2006/0047925 A1* | 3/2006 | Perry | 711/162 |
| 2006/0047999 A1* | 3/2006 | Passerini et al. | 714/6 |
| 2006/0075191 A1* | 4/2006 | Lolayekar et al. | 711/114 |
| 2007/0294314 A1* | 12/2007 | Padovano et al. | 707/201 |
| 2008/0098117 A1* | 4/2008 | Fukuhara et al. | 709/227 |
| 2008/0301492 A1 | 12/2008 | Honda et al. | |
| 2010/0235324 A1* | 9/2010 | Kan et al. | 707/634 |
| 2010/0262580 A1* | 10/2010 | Cho et al. | 707/610 |
| 2011/0078494 A1* | 3/2011 | Maki et al. | 714/6.12 |
| 2011/0161520 A1* | 6/2011 | Horiuchi et al. | 709/244 |
| 2011/0196828 A1* | 8/2011 | Drobychev et al. | 707/622 |
| 2011/0238634 A1* | 9/2011 | Kobara | 707/692 |
| 2011/0295796 A1* | 12/2011 | Muhunthan et al. | 707/610 |
| 2012/0011313 A1* | 1/2012 | Kopylovitz et al. | 711/113 |
| 2012/0011394 A1* | 1/2012 | Maki et al. | 714/6.3 |
| 2012/0030415 A1* | 2/2012 | Selfin et al. | 711/103 |
| 2012/0208735 A1* | 8/2012 | Byrne et al. | 510/241 |
| 2012/0221532 A1* | 8/2012 | Watanabe et al. | 707/687 |
| 2012/0260051 A1* | 10/2012 | Maki et al. | 711/162 |
| 2012/0330887 A1* | 12/2012 | Young et al. | 707/610 |
| 2013/0132338 A1* | 5/2013 | Numakami | 707/610 |
| 2013/0132673 A1* | 5/2013 | Saito et al. | 711/118 |
| 2013/0132692 A1* | 5/2013 | Kato et al. | 711/162 |
| 2013/0218838 A1* | 8/2013 | Bevan et al. | 707/626 |
| 2014/0032493 A1* | 1/2014 | Wang | 707/610 |

* cited by examiner

| IDENTIFICATION NUMBER |
|---|
| 0x0001 |
| 0x0002 |
| 0x0003 |
| 0x0004 |
| 0x0005 |

| TRANSMITTED-FROM IDENTIFICATION NUMBER | TRANSMITTED-TO IDENTIFICATION NUMBER | RESPONSE TIME (s) |
|---|---|---|
| 0x0001 | 0x0002 | 4.5 |
| 0x0001 | 0x0004 | 3.0 |
| 0x0001 | 0x0005 | 7.5 |

| TRANSMITTED-FROM IDENTIFICATION NUMBER /701 | TRANSMITTED-TO IDENTIFICATION NUMBER /702 | RESPONSE TIME (s) /703 | |
|---|---|---|---|
| 0x0001 | 0x0002 | 4.5 | ⎫ |
| 0x0001 | 0x0004 | 3.5 | ⎬ 710 |
| 0x0001 | 0x0005 | 7.5 | ⎭ |
| 0x0002 | 0x0001 | 4.5 | ⎫ |
| 0x0002 | 0x0003 | 2.0 | ⎬ 711 |
| 0x0002 | 0x0004 | 1.5 | ⎭ |
| 0x0003 | 0x0002 | 2.0 | ⎫ 712 |
| 0x0003 | 0x0004 | 3.5 | ⎭ |
| 0x0004 | 0x0001 | 3.5 | ⎫ |
| 0x0004 | 0x0002 | 1.5 | ⎬ 713 |
| 0x0004 | 0x0003 | 3.5 | |
| 0x0004 | 0x0005 | 4.5 | ⎭ |
| 0x0005 | 0x0001 | 7.5 | ⎫ 714 |
| 0x0005 | 0x0004 | 4.5 | ⎭ |

| COPIED-FROM IDENTIFICATION NUMBER | PASSED-THROUGH IDENTIFICATION NUMBER | COPIED-TO IDENTIFICATION NUMBER | |
|---|---|---|---|
| 0x0003 | 0x0002 | 0x0001 | 910 |
| 0x0003 | 0x0004 | 0x0005 | 911 |

FIG. 13

| DATA SIZE | ADDRESS INFORMATION | PROCESSING ID | TRANSMISSION PATH INFORMATION |
|---|---|---|---|
| OOOO [BYTES] | XXX.XXX.X.XXX | 0x0000000312345678 | 0x0001,0x0002,0x0003 |

1301, 1302, 1303, 1304

CONTROL METHOD AND STORAGE CONTROLLER APPARATUS

CROSS-REFERENCE TO RELATED APPLICATION

This application is based upon and claims the benefit of priority of the prior Japanese Patent Application No. 2012-075374, filed on Mar. 29, 2012, the entire contents of which are incorporated herein by reference.

FIELD

The embodiment discussed herein is related to a control program, a control method, a storage controller, and an information processing system.

BACKGROUND

There has been a technology that synchronizes data among a plurality of storage apparatuses. When data is synchronized among a plurality of storage apparatuses, even if a storage apparatus causes a failure and data is thereby lost in the storage apparatus, the same data as the lost data remains stored in other storage apparatuses, making it possible to suppress the data from being lost. Particularly in data centers and other locations at which data is collected, it has been conventional practice to copy data stored in a data center to other data centers. There has been also a technology that synchronizes data among a plurality of storage apparatuses.

For example, synchronized data may be stored in a plurality of data centers among which data is synchronized. Then, when data is to be accessed, it is possible to appropriately select a data center that achieves the fastest access to the data by using a personal computer (PC) or another information processing apparatus that has a wireless communication function.

However, the conventional technologies are problematic in that when data is to be synchronized among two storage apparatuses or more, the data to be synchronized may have an inconsistency depending on a difference in a time of the day at which a data change is carried out in each storage apparatus and a time taken to transmit data used for synchronization.

For example, a terminal may create two different data change requests, each of which requests data to be changed, for each of two different storage apparatuses. Each of the two different storage apparatuses receives the relevant data change request and reflects new data in the other storage apparatuses in which data is to be synchronized. However, it is difficult for the other storage apparatuses in which data is to be synchronized to determine which data change request has arrived first, that is, to identify times of the day at which the data change requests arrived.

FIG. 18 illustrates a specific example, in which data centers A to D synchronously store data 1. It is assumed that, as illustrated in FIG. 18, it takes 2.0 seconds to transmit data from data center A to data center C, it takes 6.0 seconds to transmit data from data center A to data center D, it takes 6.0 seconds to transmit data from data center B to data center C, it takes 2.0 seconds to transmit data from data center B to data center D, and it takes 4.0 seconds to transmit data from data center A to data center B or to transmit data from data center B to data center A.

It is also assumed here that a data change request to change data 1 to data 2 was created for data center A at 9:00:00 and that a data change request to change data 1 to data 3 was created for data center B at 9:00:02. In this case, since the data change request to change to data 3 was created after the data change request to change to data 2, data 1 is expected to have been changed to data 3 at data centers A to D after these data change requests had been reflected.

However, data center D first receives the data change request created for data center B. If data center D changes data in the order of data reception, therefore, data 2 is stored as the latest data. This is also true for data center B. As a result, data stored in data centers A to D causes inconsistencies, so it is difficult to apply to the conventional technologies to an aspect in which a terminal selects any data center to access data.

SUMMARY

According to an aspect of the invention, a control method executed by a first storage control apparatus, connected to an information processing apparatus so as to be mutually communicate, that transmits data to a second storage control apparatus for data synchronization with the first control apparatus, the method comprises receiving, from the information processing apparatus, a request to change data stored in a storage unit provided in the first storage control apparatus so as to be synchronized to changed data, extracting address information, included in the request, that identifies an address at which data corresponding to the data to be synchronized has been stored in a storage unit provided in the second storage control apparatus, creating time information that identifies a time of the day at which the request was received and transmitting a change request, which includes the extracted address information and the created time information, from the first storage control apparatus to the second storage control apparatus, the change request requesting the corresponding data stored in the second storage control apparatus to be changed to the changed data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 illustrates an identification number;

FIG. 5 illustrates response time information;

FIG. 7 illustrates response time information;

FIG. 9 illustrates transmission path information;

FIG. 13 illustrates an example of information included in a data transmission request packet transmitted by a destination apparatus;

DESCRIPTION OF EMBODIMENT

An embodiment of the present disclosure will be described below.

Figure 1:
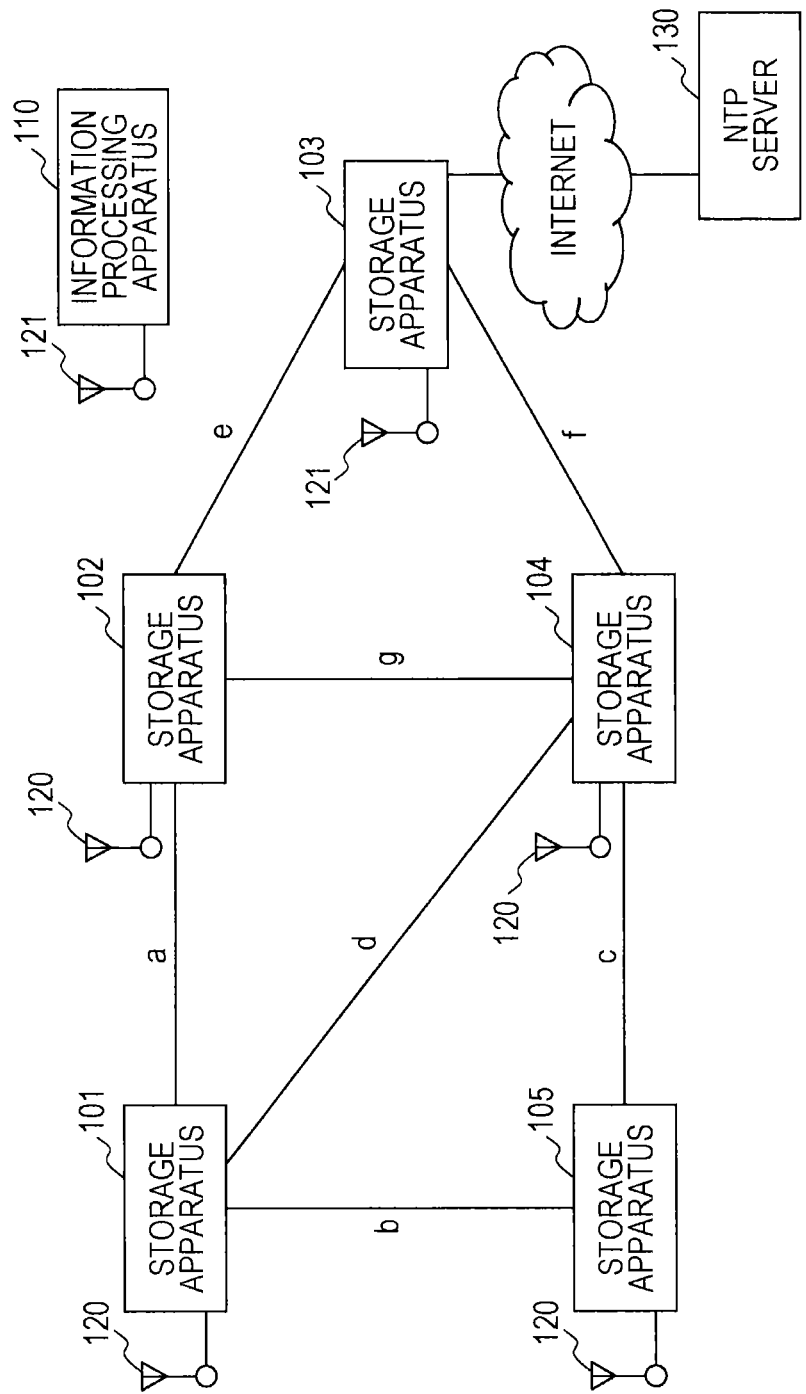
FIG. 1 illustrates an information processing system in an embodiment.

FIG. 1 illustrates an information processing system 100 in an embodiment in which storage apparatuses 101 to 105 are mutually connected. In this embodiment, an aspect in which data is synchronized among the storage apparatuses 101 to 105 illustrated in FIG. 1 will be considered. Specifically, data stored in the storage apparatuses 101 to 105 is synchronized. Each of the storage apparatuses 101 to 105 may be, for example, a data center that includes a storage unit and a controller that controls the storage unit.

Communication paths in FIG. 1, which link the storage apparatuses 101 to 105, are denoted the letters "a" to "g". The communication paths link the storage apparatuses 101 to 105 as follows:

Communication path "a": between the storage apparatus 101 and the storage apparatus 102

Communication path "b": between the storage apparatus 101 and the storage apparatus 105

Communication path "c": between the storage apparatus 104 and the storage apparatus 105

Communication path "d": between the storage apparatus 101 and the storage apparatus 104

Communication path "e": between the storage apparatus 102 and the storage apparatus 103

Communication path "f": between the storage apparatus 103 and the storage apparatus 104

Communication path "g": between the storage apparatus 102 and the storage apparatus 104

As described above, each of the storage apparatuses 101 to 105 is connected at least one of the storage apparatuses 101 to 105 excluding itself. Each of the storage apparatuses 101 to 105 is also connected to an information processing apparatus 110, which transmits, to a storage apparatus, a request to change data stored in the storage apparatus. Each of the storage apparatuses 101 to 105 may have a wireless unit 120 and the information processing apparatus 110 may have a wireless unit 121 so each of the storage apparatuses 101 to 105 is connected to the information processing apparatus 110 through wireless communication. Although, in FIG. 1, only one information processing apparatus 110 is illustrated as an example, the number of information processing apparatuses 110 is not limited to the aspect illustrated in FIG. 1.

In addition, the storage apparatuses 101 to 105 may be connected to a network time protocol (NTP) server 130 through the Internet as illustrated in FIG. 1 to synchronize the times of clocks provided in the storage apparatuses 101 to 105.

Figure 2:
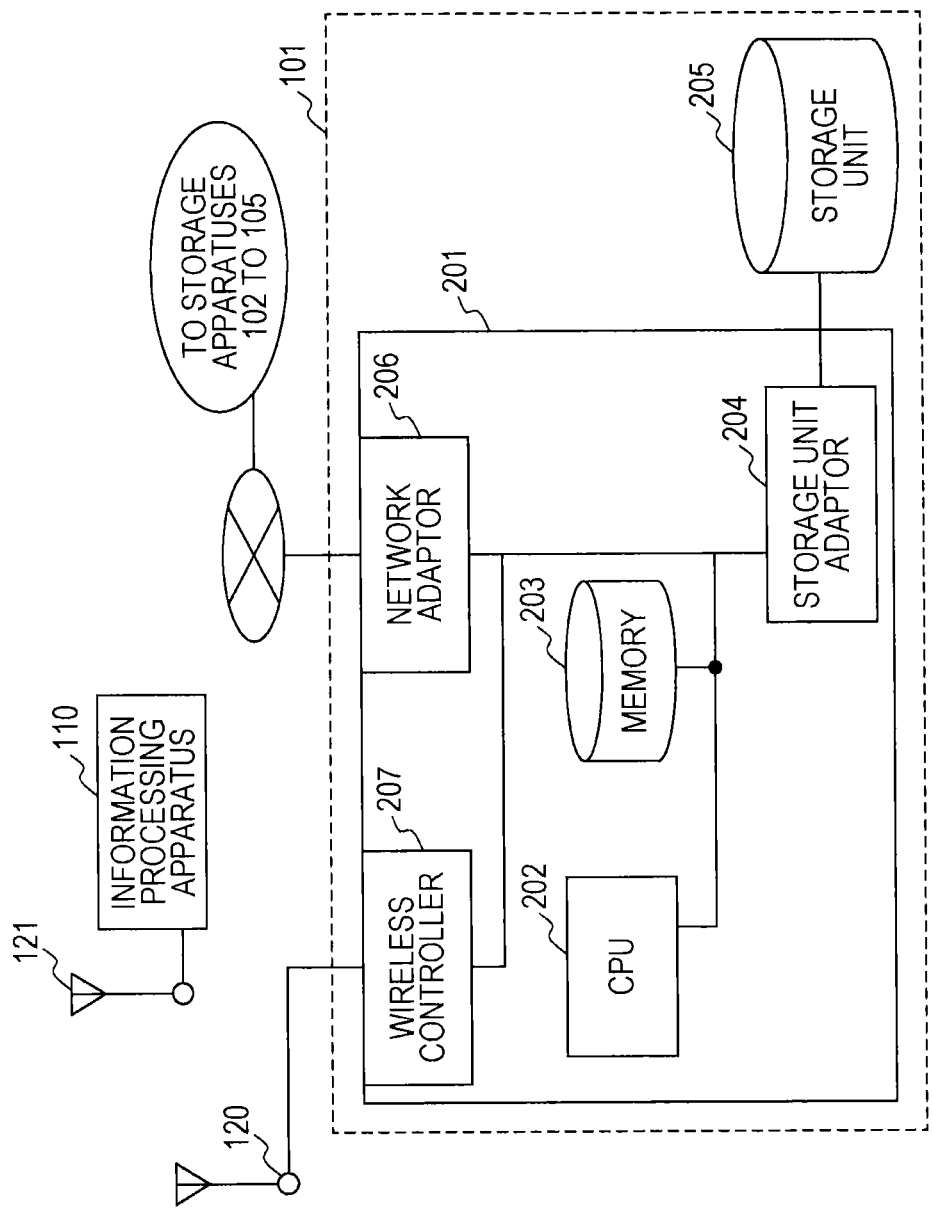
FIG. 2 illustrates an example of the hardware structure of a storage apparatus.

FIG. 2 illustrates an example of the hardware structure of the storage apparatus 101. The storage apparatus 101 includes a controller 201 and a storage unit 205 controlled by the controller 201.

The controller 201 includes a central processing unit (CPU) 202, a memory 203, a storage unit adaptor 204, a network adaptor 206, and a wireless controller 207, which are mutually connected through a bus so as to mutually communicate.

The CPU 202 controls the storage unit 205 connected to the controller 201. The memory 203 stores information that is used to control the storage unit 205. The storage unit 205 stores programs executed by the CPU 202.

The controller 201 is connected to the storage unit 205 through the storage unit adaptor 204. To interconnect the storage unit adaptor 204 and storage unit 205, a small computer system interface (SCSI) may be used, for example. Examples of the storage unit 205 may include a magnetic disk storage unit and a semiconductor storage unit. A plurality of storage units 205 may be connected to the controller 201.

The controller 201 is connectable to the storage apparatuses 102 to 105 or to the information processing apparatus 110 through the network adaptor 206.

The wireless unit 120 may be, for example, a base station used for wireless communication. The wireless controller 207 transmits and receives data through the base station.

In this embodiment, the storage apparatuses 102 to 105 may have a hardware structure similar to the hardware structure of the storage apparatus 101.

Figure 3:
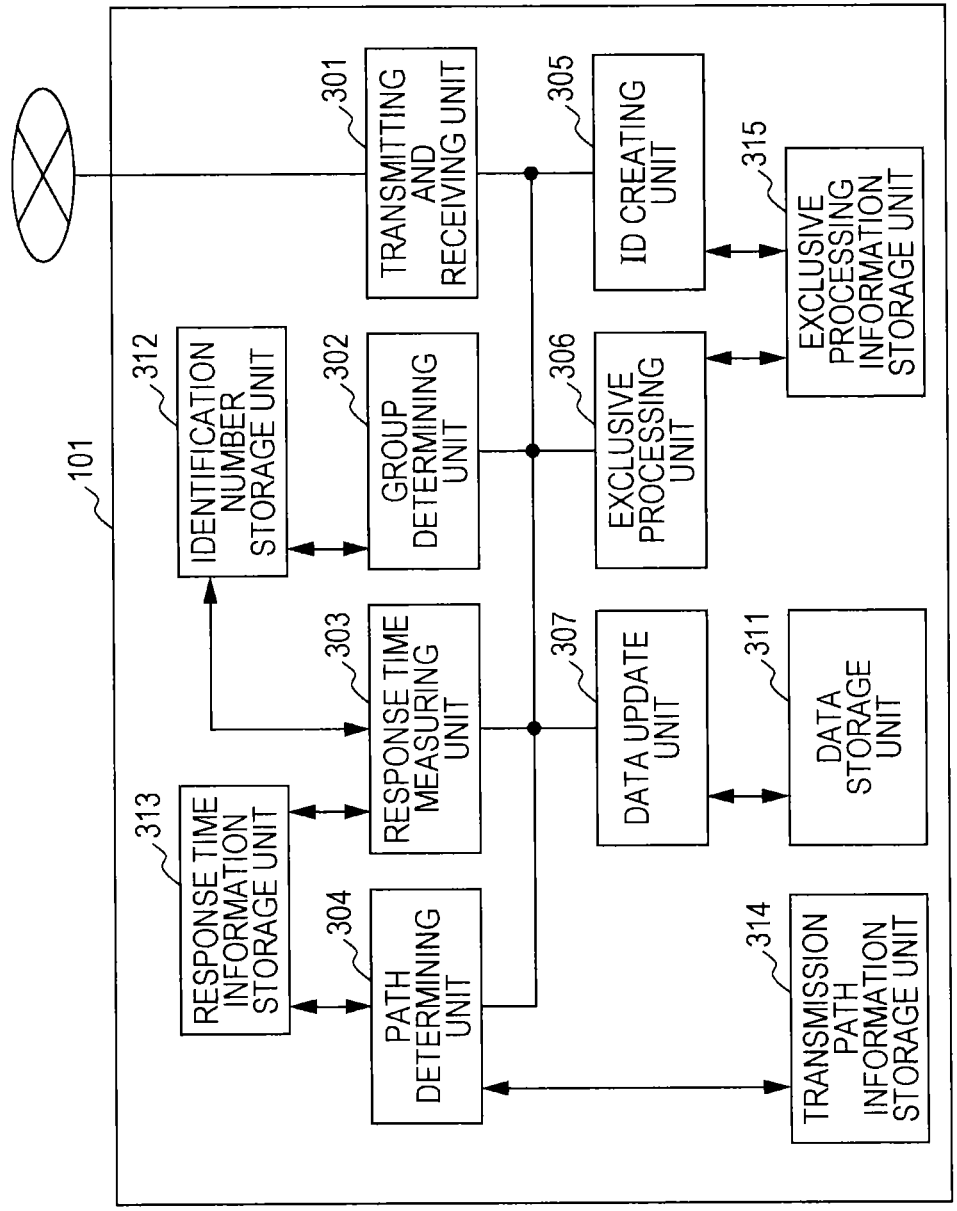
FIG. 3 is a functional block diagram of the storage apparatus.

FIG. 3 is a functional block diagram of the storage apparatus 101. The storage apparatus 101 in this embodiment includes a transmitting and receiving unit 301, a group determining unit 302, a response time measuring unit 303, a path determining unit 304, an identifier (ID) creating unit 305, an exclusive processing unit 306, and a data update unit 307. The storage apparatus 101 also includes a data storage unit 311, an identification number storage unit 312, a response time information storage unit 313, a transmission path information storage unit 314, and an exclusive processing information storage unit 315. Operations of these components will be described later.

The group determining unit 302, response time measuring unit 303, path determining unit 304, ID creating unit 305, exclusive processing unit 306, and data update unit 307 in FIG. 3 may be implemented by having the CPU 202 execute programs stored in the storage unit 205. The transmitting and receiving unit 301 may be, for example, an interface unit such as the network adaptor 206 or wireless controller 207 in FIG. 2. The data storage unit 311 may be implemented by using the storage unit 205. The identification number storage unit 312, response time information storage unit 313, transmission path information storage unit 314, and exclusive processing information storage unit 315 may be implemented by using the memory 203 or storage unit 205.

Definition of the Group

First, a group of storage apparatuses among which data is to be synchronized will be defined. Data to be synchronized is stored in the data storage unit 311 described above. A group of storage apparatuses among which data is to be synchronized may be defined in advance; the manger of the information processing system 100 in FIG. 1, for example, may define a group by using the information processing apparatus 110 to make settings through, for example, a graphical user interface (GUI) or by, for example, performing prescribed input and output operations.

FIG. 4 illustrates an aspect of an identification number 400 stored in the identification number storage unit 312 in the controller 201. To define a storage apparatus with which to synchronize data, the group determining unit 302 stores, in the identification number storage unit 312, an identification number that identifies the storage apparatus as illustrated in FIG. 4. The identification number 400 in FIG. 4 includes identification numbers 0x0001 to 0x0005 that are respectively assigned to the storage apparatuses 101 to 105 to identify them. In this embodiment, these identification numbers are in hexadecimal.

The identification number 400 in FIG. 4 indicates that the storage apparatus 101, storage apparatus 102, storage apparatus 103, storage apparatus 104, and storage apparatus 105 are defined as a group in which data is to be synchronized. FIG. 4 only illustrates a technique that defines a group of storage apparatuses among which data is to be synchronized; a technique to define a group may be implemented by other than the aspect illustrated in FIG. 4.

Measurement of Response Times

After a group in which data is to be synchronized has been defined, the response time measuring unit 303 in each of the storage apparatuses 101 to 105 measures response times taken when data is destination other storage apparatuses that are in direct connection to the storage apparatus. The direct connection indicates an aspect in which two storage apparatuses are mutually connected without any other storage apparatus interposed therebetween. As for the storage apparatus 101 illustrated in FIG. 1, for example, the storage apparatus 101 is in direct connection to the storage apparatus 102 through the communication path "a", in direct connection to the storage apparatus 105 through the communication path "b", and in direct connection to the storage apparatus 104 through the communication path "d".

The response time measuring unit 303 in the storage apparatus 101 measures response times taken when data is destination the storage apparatuses 102, 104, and 105. The response time is a time taken from when a storage apparatus (source apparatus), from which to transmit data, transmits data to a storage apparatus (destination apparatus), to which to transmit the data, until the destination apparatus receives the data and the source apparatus receives a response from the destination apparatus.

As an example of a method of measuring a response time, the response time measuring unit 303 may measure a time taken from when the response time measuring unit 303 transmits a response time measurement packet to another storage apparatus until the response time measuring unit 303 receives a response (reception response packet), which indicates that the response time measurement packet has been received, from the other storage apparatus, which is the destination of the response time measurement packet, and may handle the measured time as the response time. The response time measurement packet and reception response packet may be, for example, so-called empty packets, in which no transmission data is included.

FIG. 5 illustrates response time information 500, which is stored in the response time information storage unit 313. The response time measuring unit 303 stores the measured response time in the response time information storage unit 313. The response time information 500 in FIG. 5 indicates that the response time measuring unit 303 in the storage apparatus 101 has transmitted a response time measurement packet through the transmitting and receiving unit 301 to the storage apparatus 102 and has obtained a response time of 4.5 seconds and also indicates that response time measuring unit 303 has similarly obtained a response time of 3.0 seconds for the storage apparatus 104 and a response time of 7.5 seconds for the storage apparatus 105.

In FIG. 5 and FIG. 7, which will be referenced later, the source identification number is the identification number of a storage apparatus that has transmitted a response time measurement packet to measure a response time and the destination identification number is the identification number of a storage apparatus to which the response time measurement packet has been transmitted (the storage apparatus is a target for which a response time is to be measured).

The measurement of the response time may be periodically carried out by the response time measuring unit 303.

Figure 6:
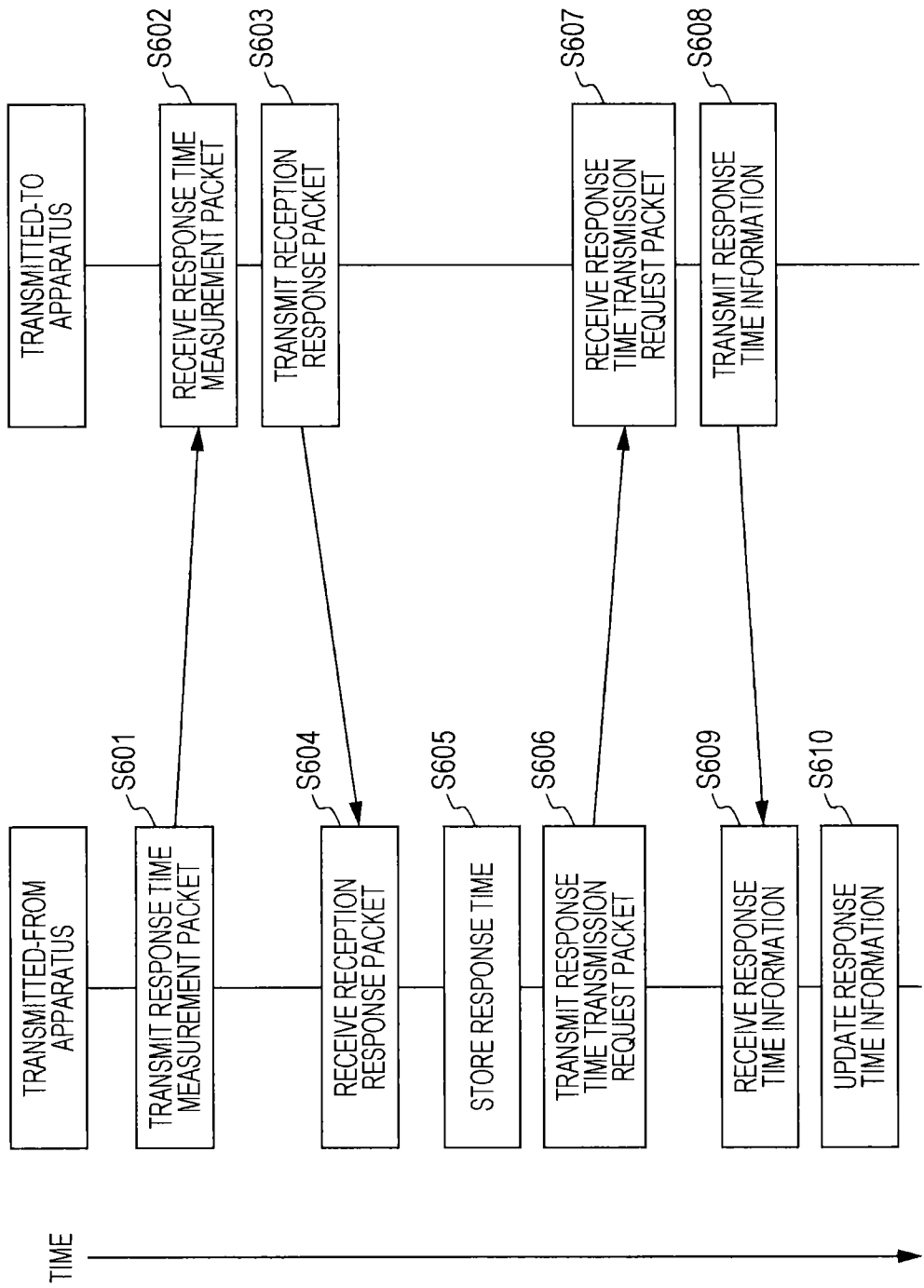
FIG. 6 is a sequence diagram representing a procedure in processing that is periodically executed by a response time measuring unit in the embodiment.

FIG. 6 is a sequence diagram representing an example of a procedure in processing that is periodically executed by the response time measuring unit 303 in this embodiment.

The sequence diagram in FIG. 6 will be described. First, the response time measuring unit 303 in the source apparatus transmits a response time measurement packet through the transmitting and receiving unit 301 to the destination apparatus that is in direct connection to the storage apparatus (S601).

The destination apparatus receives the response time measurement packet source the source apparatus (S602). The destination apparatus then transmits a reception response packet to the source apparatus in response to the response time measurement packet (S603).

The response time measuring unit 303 in the source apparatus receives the reception response packet source the destination apparatus (S604). The response time measuring unit 303 then stores a time measured from when the response time measuring unit 303 has transmitted the response time measurement packet in step S601 until in step S604, the response time measuring unit 303 has received the reception response packet source the destination apparatus in the response time information storage unit 313 as a response time for the destination apparatus (S605).

If there are a plurality of destination apparatuses, the response time measuring unit 303 executes the processing in steps S601 to step S605 for each destination apparatus. If the source apparatus is, for example, the storage apparatus 101 illustrated in FIG. 1, the response time measuring unit 303 executes the processing in steps S601 to S605 for each of the storage apparatuses 102, 104, and 105.

After having stored the response time in step S605, the response time measuring unit 303 in the source apparatus transmits, to the destination apparatus, a request (response time transmission request packet) to transmit, to the source apparatus, the response time stored in the response time information storage unit 313 in the destination apparatus (S606).

The destination apparatus receives, at the transmitting and receiving unit 301, the request to transmit, to the source apparatus, the response time stored in the response time information storage unit 313 in the destination apparatus (S607). The destination apparatus transmits, to the source apparatus, the response time information 500 stored in the response time information storage unit 313 in the destination apparatus (S608).

The source apparatus receives, at the transmitting and receiving unit 301, the response time information source the destination apparatus (S609). The source apparatus then update the response time information stored in the response time information storage unit 313 in the source apparatus, according to the response time information that the transmitting and receiving unit 301 has received in step S609 (S610). If no response time information is stored in the response time information storage unit 313 at that time, the newly created response time information may be stored in the response time information storage unit 313.

In the procedure illustrated in FIG. 6, the response time measuring unit 303 transmits a response time transmission request packet after it has measured a response time, and the storage apparatus that has received the response time transmission request packet transmits response time information to the storage apparatus that has transmitted the response time transmission request packet.

However, the procedure for obtaining the response time information is not limited to this procedure. For example, after having completed the processing in step S605, the response time measuring unit 303 in the source apparatus may transmit, to the destination apparatus, the response time information stored in the response time information storage unit 313 in the source apparatus in step S605 and the destination apparatus may receive the response time information source the source apparatus.

Measurement of a response time and transmission and reception of response time information may not be carried out as a series of processing as illustrated in FIG. 6; measurement of a response time and transmission and reception of response time information may be independently carried out.

FIG. 7 illustrates response time information 700 that is stored in the response time information storage unit 313 disposed in each of the storage apparatuses 101 to 105 as a result of execution of the procedure in steps S601 to S610 described above by each of the storage apparatuses 101 to 105. The response time information 700 in FIG. 7 is a collection of response time information measured by each of the storage apparatuses 101 to 105. The source identification number 701 identifies a source apparatus. The destination identification number 702 identifies a destination apparatus. The response time 703 is information indicating a measured response time.

The response time information 710 in the response time information 700 is a result of response time measurement performed by the storage apparatus 101 as a source apparatus. The response time information 711 is a result of response time measurement performed by the storage apparatus 102 as a source apparatus. The response time information 712 is a result of response time measurement performed by the storage apparatus 103 as a source apparatus. The response time information 713 is a result of response time measurement performed by the storage apparatus 104 as a source apparatus. The response time information 714 is a result of response time measurement performed by the storage apparatus 105 as a source apparatus.

Subsequently, in this embodiment, the response time information 700 illustrated in FIG. 7 is stored in the response time information storage unit 313 in each of the storage apparatuses 101 to 105.

Determination of a Transmission Path

When any one of the storage apparatuses 101 to 105 receives, from the information processing apparatus 110, a request to change data stored in the data storage unit 311, the storage apparatus carries out processing described below. That is, to synchronize data with the storage apparatuses excluding the storage apparatus that has received the request to change data, the storage apparatus determines a transmission path through which a request (data transmission request packet) to transmit data that is used to reflect a change in data, information that is used to change the data, and the like are destination the other storage apparatuses.

Figure 8:
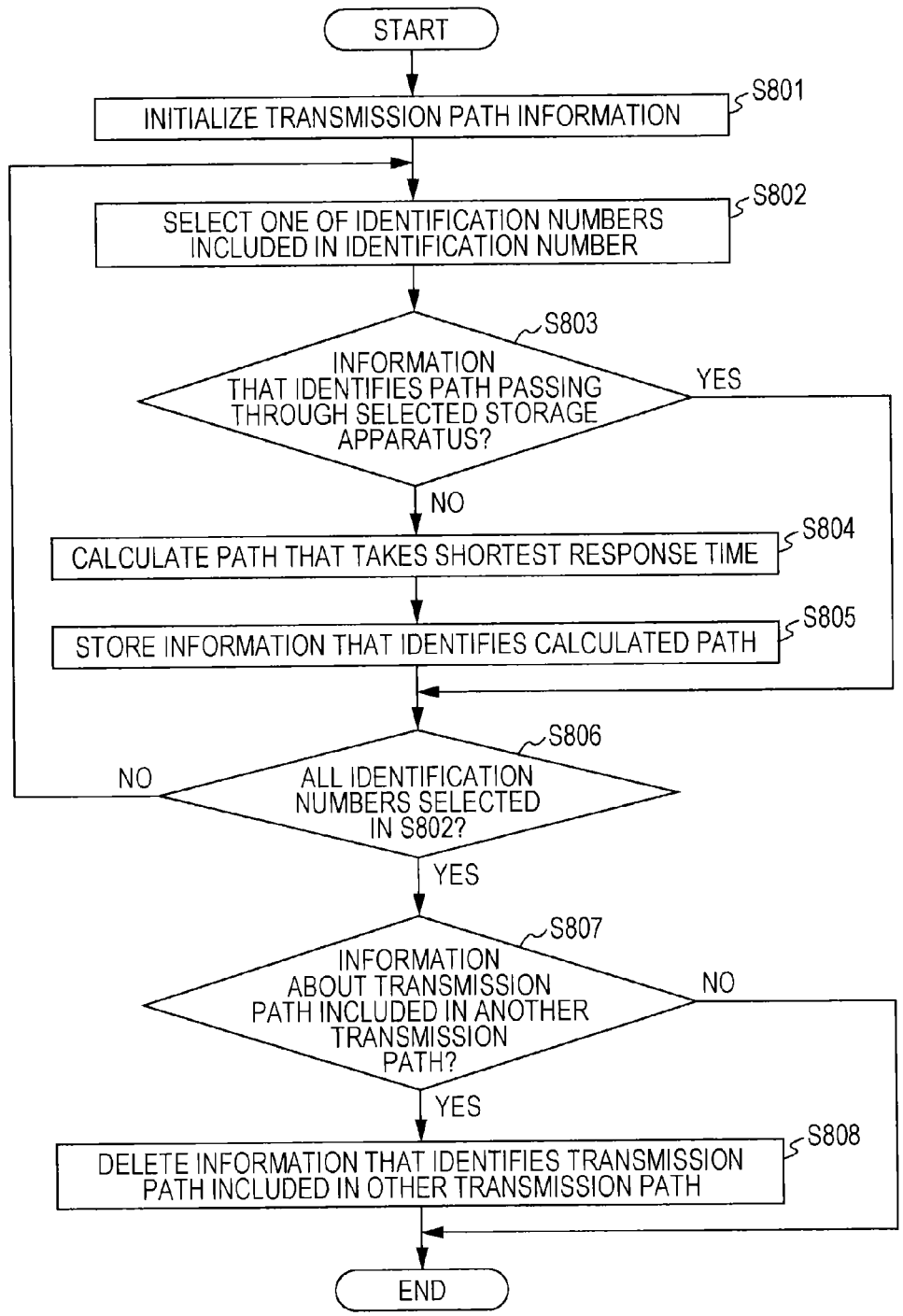
FIG. 8 is a flowchart representing a procedure in processing in which a path determining unit determines a transmission path.

FIG. 8 is a flowchart representing a procedure in processing executed by the path determining unit 304 in the storage apparatus that transmits a data transmission request packet, information that is used to change the data, and the like (the storage apparatus will be referred to below as the copied-from apparatus) in this embodiment. The procedure in which the storage apparatuses 101 to 105 determine a transmission path will be described with reference to FIG. 8.

If a transmission path is already stored in the transmission path information storage unit 314 before the path determining unit 304 in the copied-from apparatus starts processing to determine a path, the path determining unit 304 deletes, from the transmission path information storage unit 314, information that identifies a transmission path (initializes the information) (S801). The path determining unit 304 may store the information about the transmission path from the transmission path information storage unit 314 to another storage area, in the memory 203, other than the transmission path information storage unit 314 before deleting the information about the transmission path.

After having determined a new transmission path in processing described later, the path determining unit 304 may delete the information about the transmission path stored in the other storage area in the memory 203. When processing to store the information about the transmission path from the transmission path information storage unit 314 to another storage area other, than the transmission path information storage unit 314, in the memory 203, it becomes possible to suppress the information about the transmission path from being deleted. Specifically, even when data is synchronized during the execution of processing for the path determining unit 304 to determine a transmission path, the storage apparatus is operable to identify a transmission path through which to transmit data according to the information about the transmission path stored in the other storage area in the memory 203.

After having executed the processing in step S801, the path determining unit 304 references the identification number 400 stored in the identification number storage unit 312. The path determining unit 304 then selects one of the identification numbers 0x0001 to 0x0005, included in the identification number 400, which respectively identify the storage apparatuses 101 to 105 (S802). If, for example, the copied-from apparatus is a storage apparatus other than the storage apparatus 101, the path determining unit 304 may select the smallest identification number (0x0001, in this example). Alternatively, the path determining unit 304 may select the largest identification number. The path determining unit 304 then executes processing to calculate a transmission path through which to transmit data to the storage apparatus selected in step S802 (the storage apparatus will be referred to below as the copied-to apparatus).

The path determining unit 304 determines whether information that identifies the transmission path that passes through the copied-to apparatus has been stored in the transmission path information storage unit 314 (S803). It is assumed as an example that the storage apparatus 102 is selected as the copied-to apparatus and information that identifies a transmission path through which data is source the storage apparatus 103 through the storage apparatus 102 to the storage apparatus 101 has been stored in the transmission path information storage unit 314. When the information that identifies a transmission path through which data is source the storage apparatus 103 through the storage apparatus 102 to the storage apparatus 101 has been stored, the path determining unit 304 determines that information that identifies the transmission path that passes through the storage apparatus 102 has been stored in the transmission path information storage unit 314.

If the path determining unit 304 determines that information that identifies the transmission path that passes through the copied-to apparatus has been stored in the transmission path information storage unit 314, the path determining unit 304 executes processing in step S806.

If the path determining unit 304 determines that information that identifies the transmission path that passes through the copied-to apparatus has not been stored in the transmission path information storage unit 314, the path determining unit 304 executes processing in step S804. When information that identifies the transmission path has not been stored in the transmission path information storage unit 314, the path determining unit 304 determines that information that identifies the transmission path that passes through the copied-to apparatus has not been stored in the transmission path information storage unit 314 and executes the processing in step S804.

In step S804, the path determining unit 304 determines the transmission path that takes the shortest response time in data transmission to the selected storage apparatus. The transmission path that takes the shortest response time may be determined with reference to the response time information 500 by using a method of determining the shortest path such as the Dijkstra's algorithm. A specific method used in step S804 will be described later.

After having determined the transmission path that takes the shortest response time, the path determining unit 304 stores information that identifies the determined transmission path in the transmission path information storage unit 314 as the information that identifies the transmission path through which to transmit data to the copied-to apparatus (S805).

Upon completion of the processing in step S805, the path determining unit 304 determines whether all identification numbers included in the identification number 400 have been selected in step S802 (S806). If the path determining unit 304 determines that there are identification numbers, included in the identification number 400, that have not been selected in step S802, the sequence returns to the processing in step S802, where the path determining unit 304 selects one of the non-selected storage apparatuses and repeats the processing in step S803 and later. If the path determining unit 304 determines that all identification numbers included in the identification number 400 have been selected, the path determining unit 304 executes processing in step S807.

If, for example, the copied-from apparatus is storage apparatus 103, and the identification number 0x0001 has been selected in step S802 but the identification numbers 0x0002, 0x0004, and 0x0005 have not been selected, the sequence returns to the processing in step S802. If, for example, the copied-from apparatus is storage apparatus 103 and the identification numbers 0x0001, 0x0002, 0x0004, and 0x0005 have been selected in step S802, the path determining unit 304 executes the processing in step S807.

In step S807, the path determining unit 304 determines whether some transmission paths identified by transmission path information stored in the transmission path information storage unit 314 include a transmission path included in another transmission path. If information that identifies a transmission path included in another transmission path is stored, the path determining unit 304 deletes, from the transmission path information storage unit 314, the information that identifies the transmission path included in the other transmission path (S808). If the path determining unit 304 determines in step S807 that information that identifies a transmission path included in another transmission path is not stored, the path determining unit 304 terminates the path determining processing without executing the processing in step S808.

A specific example will be described. It is assumed, for example, that the copied-from apparatus is the storage apparatus 103 and the transmission path information storage unit 314 in the storage apparatus 103 includes information described below that identifies transmission paths 1 to 3 described below.

Transmission path 1 is transmission path through which data is source the storage apparatus 103, which is used as the copied-from apparatus, through the storage apparatus 102 to the storage apparatus 101, which is used as the copied-to apparatus Transmission path 2 is transmission path through which data is source the storage apparatus 103, which is used as the copied-from apparatus, through the storage apparatus 104 to the storage apparatus 105, which is used as the copied-to apparatus Transmission path 3 is transmission path through which data is source the storage apparatus 103, which is used as the copied-from apparatus, to the storage apparatus 104, which is used as the copied-to apparatus Transmission path 3 is part of transmission path 2 and is thereby included in transmission path 2, so the path determining unit 304 deletes information that identifies transmission path 3 from the transmission path information storage unit 314 (S808).

Upon completion of the processing in step S808, the path determining unit 304 terminates the path determining processing illustrated in FIG. 8.

When the procedure described above is executed, it becomes possible to determine a transmission path through which to transmit data from a copied-from apparatus to a copied-to apparatus. With the procedure, it is possible to determine a transmission path for which a total of response times (total response time) is shortest in data transmission to the copied-to apparatus and to store the determined transmission path in the transmission path information storage unit 314. It is also possible to delete a transmission path included in another transmission path, enabling a more efficient transmission path to be determined. The processing illustrated in FIG. 8 may be periodically executed by the path determining unit 304.

FIG. 9 illustrates an example of information stored in the transmission path information storage unit 314. In step S805, the path determining unit 304 may store, for example, transmission path information 900 illustrated in FIG. 9 in the transmission path information storage unit 314 as the information that identifies a transmission path. The transmission path information 910, which is part of the transmission path information 900, identifies transmission path 1 described above. The transmission path information 911, which is also part of the transmission path information 900, identifies transmission path 2 described above.

As described above, the path determining unit 304 executes processing to determine the transmission path that takes the shortest total response time in step S804. In this processing, a case will be described in which the transmission path that takes the shortest total transmission path in data transmission from the storage apparatus 103 to the storage apparatus 101 is calculated according to the Dijkstra's algorithm.

First, the storage apparatus 103 is set as the copied-from apparatus. Response times taken for data transmission to storage apparatuses that are in direct connection to the storage apparatus 103 are then calculated. The storage apparatuses in direct connection to the storage apparatus 103 are the storage apparatuses 102 and 104. The response times taken for data transmission from the storage apparatus 103 to the storage apparatuses 102 and 104 may be calculated according to, for example, the response time information 700 stored in the response time information storage unit 313. Referring to the response time information 700, the response time taken for data transmission from the storage apparatus 103 to the storage apparatus 102 is 2.0 seconds and the response time taken for data transmission from the storage apparatus 103 to the storage apparatus 104 is 3.5 seconds.

The path determining unit 304 stores the identification numbers of the storage apparatuses 102 and 104, the response times, and the identification numbers of immediately preceding passed-through storage apparatuses in correspondence to one another. In this example, no storage apparatus has been passed through, so the identification number of the storage apparatus 103, which is the copied-from apparatus, is stored.

A processed flag is assigned in correspondence to the identification number of the storage apparatus 103. The processed flag is a flag that is assigned to the identification number of a storage apparatus for which the processing to calculate the shortest total response time has been completed. For example, since the storage apparatus 103 described above is the coped-from storage apparatus, a response time for the copied-from apparatus is 0 second, indicating that the processing to calculate the shortest total response time has been completed for the storage apparatus 103. Accordingly, the processed flag is assigned to the identification number of the storage apparatus 103.

Next, the storage apparatus for which the total response time is shortest is selected from the storage apparatuses for which response times have been calculated. The storage apparatus having an identification number assigned the processed flag is excluded from the selection. In this example, the storage apparatus 102 for which the response time is 2.0 seconds is the storage apparatus for which the total response time is shortest.

Next, the path determining unit 304 calculates response times taken for data transmission to storage apparatuses that are in direct connection to the storage apparatus 102. With referring to the response time information 700, the response time taken for data transmission from the storage apparatus 102 to the storage apparatus 101 is 4.5 seconds and the response time taken for data transmission from the storage apparatus 102 to the storage apparatus 104 is 1.5 seconds.

The path determining unit 304 adds a response time stored in correspondence to the storage apparatus 102 to the response time taken for data transmission from the storage apparatus 102 to the storage apparatus 101 and to the response time taken for data transmission from the storage apparatus 102 to the storage apparatus 104 to calculate total response times. Specifically, the path determining unit 304 adds a response time of 2.0 seconds, which has been stored in correspondence to the storage apparatus 102, to a response time of 4.5 seconds taken for data transmission from the storage apparatus 102 to the storage apparatus 101, and obtains an addition result of 6.5 seconds as the total response time for the storage apparatus 101. Similarly, the path determining unit 304 adds a response time of 2.0 seconds, which has been stored in correspondence to the storage apparatus 102, to a response time of 1.5 seconds taken for data transmission from the storage apparatus 102 to the storage apparatus 104, and obtains an addition result of 3.5 seconds as the total response time for the storage apparatus 104.

The path determining unit 304 determines whether total response times have been stored in correspondence to the identification numbers of the storage apparatuses 101 and 104. In this example, there is no total response time that has been stored in correspondence to the identification number of the storage apparatus 101, but a response time of 3.5 seconds has been stored in correspondence to the identification number of the storage apparatus 104.

The path determining unit 304 stores the identification number of the storage apparatus 101, a total response time corresponding to the storage apparatus 101, and the identification number of an immediately preceding passed-through storage apparatus in correspondence to one another. In this example, the identification number of the storage apparatus 102 is stored as the identification number of the immediately preceding passed-through storage apparatus.

If the total response time stored in correspondence to the identification number of a storage apparatus is equal to or smaller than the calculated total response time, the calculated total response time is not stored. For example, the a response time of 3.0 seconds, which has been stored in correspondence to the identification number of the storage apparatus 104, is smaller than a response time of 3.5 seconds, which has been calculated as the total response time corresponding to the storage apparatus 101. Then, the calculated response time, which is 3.5 seconds, is not stored, and the identification number is not updated. The processed flag is assigned in correspondence to the identification number of the storage apparatus 102.

Next, the storage apparatus for which the total response time is shortest is selected from the storage apparatuses for which response times have been calculated. The storage apparatus having an identification number assigned the processed flag is excluded from the selection. In this example, the storage apparatus for which the total response time is shortest is the storage apparatus 104 for which the response time is 3.0 seconds.

Next, the path determining unit 304 calculates response times for storage apparatuses that are in direct connection to the storage apparatus 104. In this example, since the storage apparatus 103 and storage apparatus 102 are assigned the processed flag, these storage apparatuses are excluded from processing.

Referring to the response time information 700, the response time taken for data transmission from the storage apparatus 102 to the storage apparatus 101 is 4.0 seconds and the response time taken for data transmission from the storage apparatus 103 to the storage apparatus 104 is 4.5 seconds.

The path determining unit 304 adds a response time stored in correspondence to the storage apparatus 102 to the response time taken for data transmission from the storage apparatus 102 to the storage apparatus 101 and to the response time taken for data transmission from the storage apparatus 103 to the storage apparatus 104 to calculate total response times. Specifically, the path determining unit 304 adds a response time of 3.0 seconds, which has been stored in correspondence to the storage apparatus 102, to a response time of 4.0 seconds taken for data transmission from the storage apparatus 104 to the storage apparatus 101, and obtains an addition result of 7.5 seconds as the total response time for the storage apparatus 101. Similarly, the path determining unit 304 adds a response time of 3.0 seconds, which has been stored in correspondence to the storage apparatus 102, to a response time of 4.5 seconds taken for data transmission from the storage apparatus 104 to the storage apparatus 105, and obtains an addition result of 7.5 seconds as the total response time for the storage apparatus 105.

The path determining unit 304 determines whether a response time or total response time has been stored in correspondence to each of the identification numbers of the storage apparatuses 101 and 105. In this example, no total response time has been stored in correspondence to the identification number of the storage apparatus 105, but a response time of 6.5 seconds has been stored in correspondence to the identification number of the storage apparatus 101.

The path determining unit 304 stores the identification number of the storage apparatus 105, a total response time corresponding to the storage apparatus 105, and the identification number of an immediately preceding passed-through storage apparatus in correspondence to one another. In this example, the identification number of the storage apparatus 104 is stored as the identification number of the immediately preceding passed-through storage apparatus.

If the total response time stored in correspondence to the identification number of a storage apparatus is equal to or smaller than the calculated total response time, the calculated total response time is not stored. For example, the a response time of 6.5 seconds, which has been stored in correspondence to the identification number of the storage apparatus 101, is smaller than a response time of 7.0 seconds, which has been calculated as the total response time corresponding to the storage apparatus 101. Then, the calculated response time is not stored, and the identification number is not updated. The processed flag is assigned in correspondence to the identification number of the storage apparatus 103.

Next, the storage apparatus for which the total response time is shortest is selected from the storage apparatuses for which response times have been calculated. The storage apparatus having an identification number assigned the processed flag is excluded from the selection. In this example, the storage apparatus for which the total response time is shortest is the storage apparatus 101 for which the response time is 6.5 seconds. Since the storage apparatus 101 has been set as the copied-to apparatus, this indicates that the shortest total response time in data transmission from the storage apparatus 103 to the storage apparatus 101 is 6.5 seconds.

Figure 10:
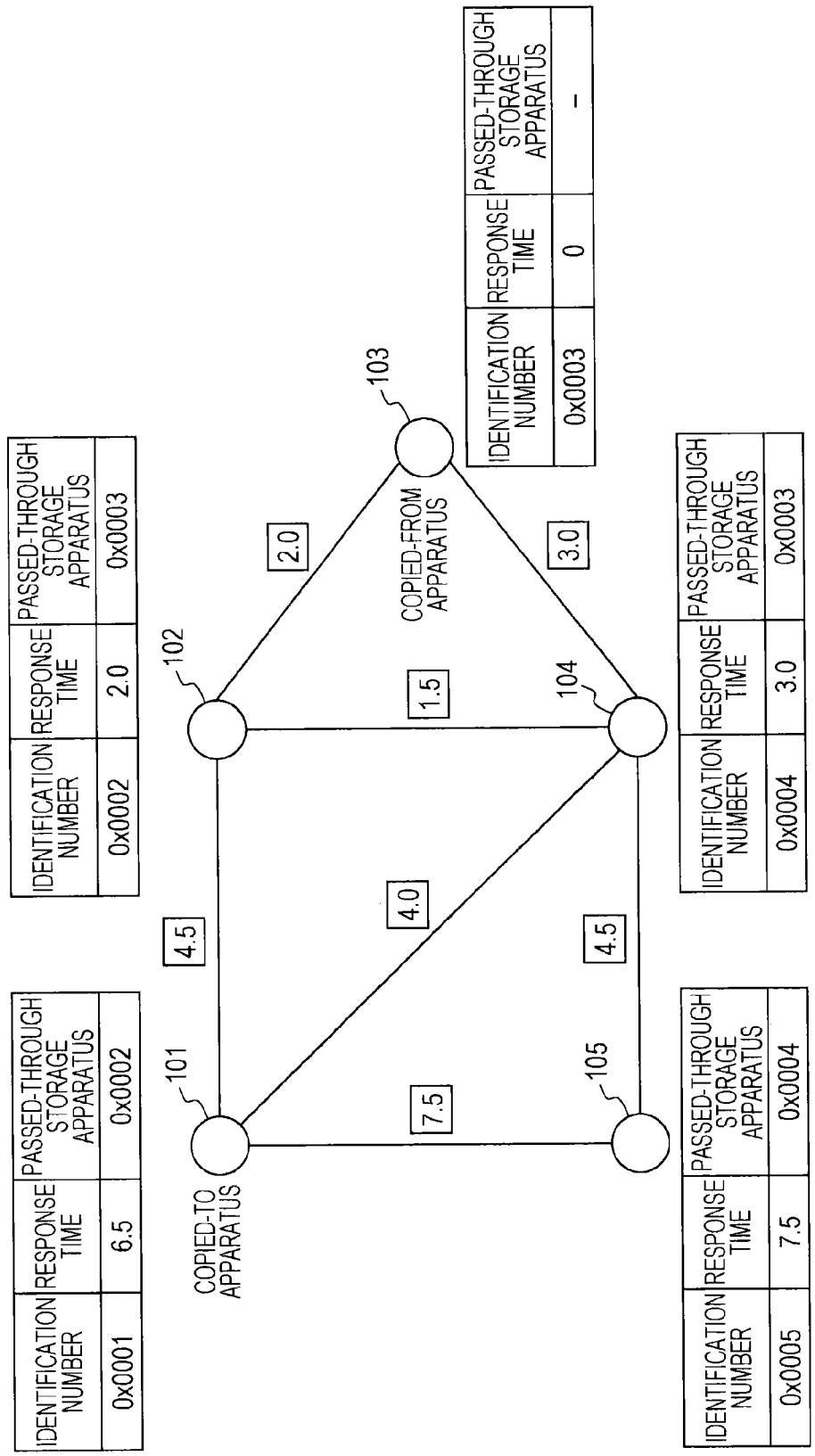
FIG. 10 illustrates processing results obtained by the Dijkstra's algorithm.

FIG. 10 illustrates the results of shortest total response times determined by the Dijkstra's algorithm. The identification number, of the immediately preceding passed-through storage apparatus, that has been stored in correspondence to the storage apparatus 101 is the identification number of the storage apparatus 102. The identification number, of the immediately preceding passed-through storage apparatus, that has been stored in correspondence to the storage apparatus 102 is the identification number of the storage apparatus 103, which is the copied-from apparatus. Therefore, it is found that the transmission path that takes the shortest total response time in data transmission from the storage apparatus 103 to the storage apparatus 101 is the transmission path along which data is source the storage apparatus 103 through the storage apparatus 102 to the storage apparatus 101.

The transmission path that takes the shortest total response time in data transmission from the copied-from apparatus to the copied-to apparatus is determined as described above. Although in the example used for explanation purposes, a transmission path has been determined in data transmission from the storage apparatus 103 to the storage apparatus 101, it is also possible to determine the transmission path that takes the shortest total response time in data transmission other than the data transmission from the storage apparatus 103 to the storage apparatus 101 by a similar procedure.

Data Transmission Procedure

Figure 11:
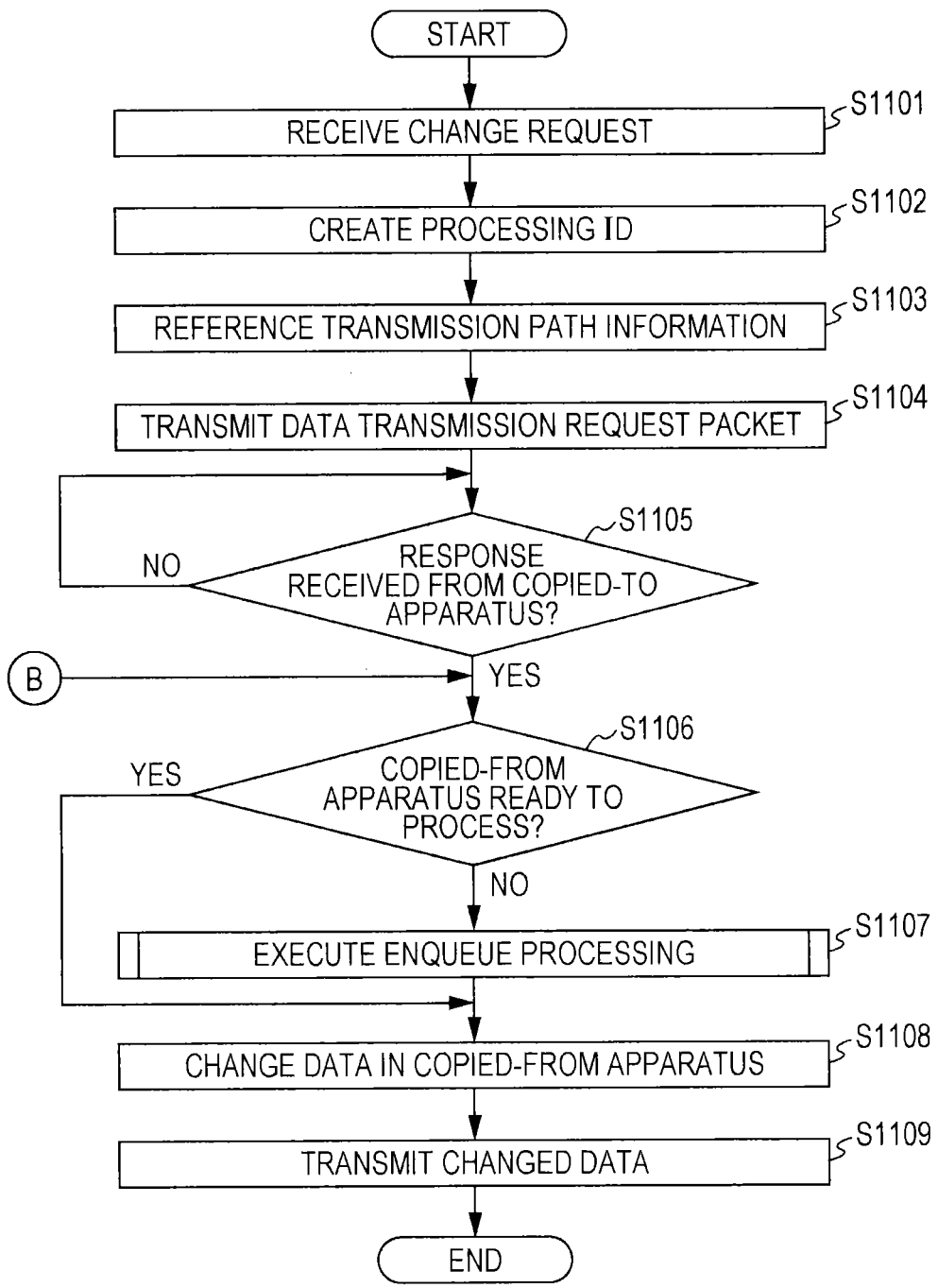
FIG. 11 is a flowchart representing a procedure in processing that is executed by a source apparatus.

FIG. 11 is a flowchart illustrating a procedure in processing executed by the copied-from apparatus that transmits a change request to change data, information that is used to change the data, and the like.

First, the transmitting and receiving unit 301 in the copied-from apparatus receives a change request to change data stored in the data storage unit 311 from the information processing apparatus 110 (S1101).

The ID creating unit 305 creates a processing ID from the identification number of the copied-from apparatus and a time at which the change request was received from the information processing apparatus 110 (S1102). The processing ID created by the ID creating unit 305 is used as information that, for example, identifies a storage apparatus that received a change request from the information processing apparatus 110 and a time at which the change request was received. The form of the processing ID will be described later.

Next, the data update unit 307 in the copied-from apparatus references transmission path information stored in the transmission path information storage unit 314 (S1103). The data update unit 307 then transmits, to the copied-to apparatus along a transmission path identified by the transmission path information, a request (data transmission request packet) indicating that data used to reflect a change in data will be destination the copied-to apparatus (S1104).

After the data transmission request packet have been transmitted through the transmitting and receiving unit 301 to the copied-to apparatus, the copied-from apparatus periodically checks whether a reception has been received from the destination apparatus and waits until a response is returned from the copied-to apparatus in response to the data transmission request packet (S1105).

If a response is received from the copied-to apparatus (the result in S1105 is Yes), the exclusive processing unit 306 in the copied-from apparatus determines whether data stored in the data storage unit 311 in the copied-from apparatus may be changed in response to the change request received by the transmitting and receiving unit 301 in step S1101 (S1106). In step S1106, if, for example, the data update unit 307 is not executing processing on data to be changed in response to the change request received by the transmitting and receiving unit 301 in step S1101, the exclusive processing unit 306 determines that the data may be changed. If the data update unit 307 is executing processing on data to be changed in response to the change request received by the transmitting and receiving unit 301 in step S1101, the exclusive processing unit 306 determines that the data may not be changed.

If the exclusive processing unit 306 determines in step S1106 that the data may not be changed, the exclusive processing unit 306 executes enqueue processing in step S1107. The enqueue processing will be described later in detail. If the exclusive processing unit 306 determines in step S1106 that the data may be changed, processing in step S1108 is executed.

In step S1108, the data update unit 307 in the copied-from apparatus changes data stored in the data storage unit 311 in the copied-from apparatus in response to the change request received by the transmitting and receiving unit 301 in step S1101 (S1108). The data update unit 307 then transmits changed data to the copied-to apparatus (S1109).

By using the procedure described above, upon receipt of a change request from the information processing apparatus 110, the copied-from apparatus changes data stored in the data storage unit 311 in the copied-from apparatus. The copied-from apparatus also transmits, to the copied-to apparatus, information used to reflect a change that has been made in response to the change request.

Figure 12:
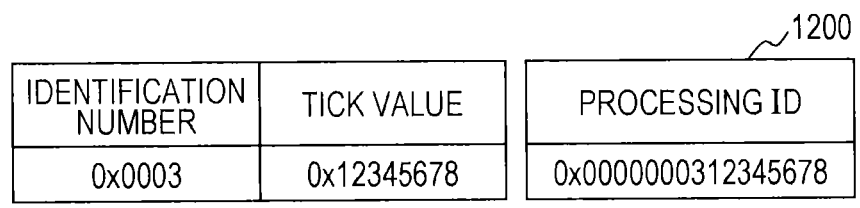
FIG. 12 illustrates processing ID.

FIG. 12 illustrates an example of a processing ID created by the ID creating unit 305 in the processing in step S1102 in FIG. 11. The processing ID in this embodiment is a 16-digit hexadecimal number; the high-order eight digits indicate an apparatus identification number and the low-order eight digits indicate a tick value. The tick value is created by the ID creating unit 305 according to the time of the day measured by an internal clock incorporated in the storage apparatus.

For example, an processing ID 1200 illustrated in FIG. 12 is a processing ID for a change request that the transmitting and receiving unit 301 in the storage apparatus 103 received at a time of the day identified by a tick value of 12345678. The exclusive processing unit 306 in the copied-to apparatus is operable to identify, from the processing ID, a storage apparatus that received a change request and a time of the day at which the storage apparatus received the change request from the information processing apparatus 110.

Specifically, the exclusive processing unit 306 in the copied-to apparatus is operable to identify, from the high-order eight digits in the processing ID, a storage apparatus that received a change request and is operable to identify, from the low-order eight digits in the processing ID, a time of the day at which the storage apparatus received the change request from the information processing apparatus 110.

FIG. 13 illustrates an example of information included in the data transmission request packet transmitted by the copied-to apparatus in step S1104. As illustrated in FIG. 13, the data transmission request packet includes a data size 1301, address information 1302, a processing ID 1303, and transmission path information 1304. The data size 1301 is information that identifies the data size (data length) of changed data. The address information 1302 indicates an address, in a storage area in the data storage unit 311, at which data to be changed has been stored.

The address at which the data to be changed has been stored is included in the change request received from the information processing apparatus 110. The data update unit 307 extracts the address, from the change request, at which the data to be changed has been stored, and creates a data transmission request packet by using the extracted address as the address information 1302. The processing ID 1303 is the processing ID generated by the ID creating unit 305 in step S1102 in FIG. 11.

The transmission path information 1304 identifies a transmission path of data. The transmission path information 1304 may have a form similar to the form of the transmission path information illustrated in FIG. 9. FIG. 13 only illustrates an example of the information included in the data transmission request packet; the form of the information included in the data transmission request packet is not limited to the form illustrated in FIG. 13.

Enqueue Processing

Figure 14:
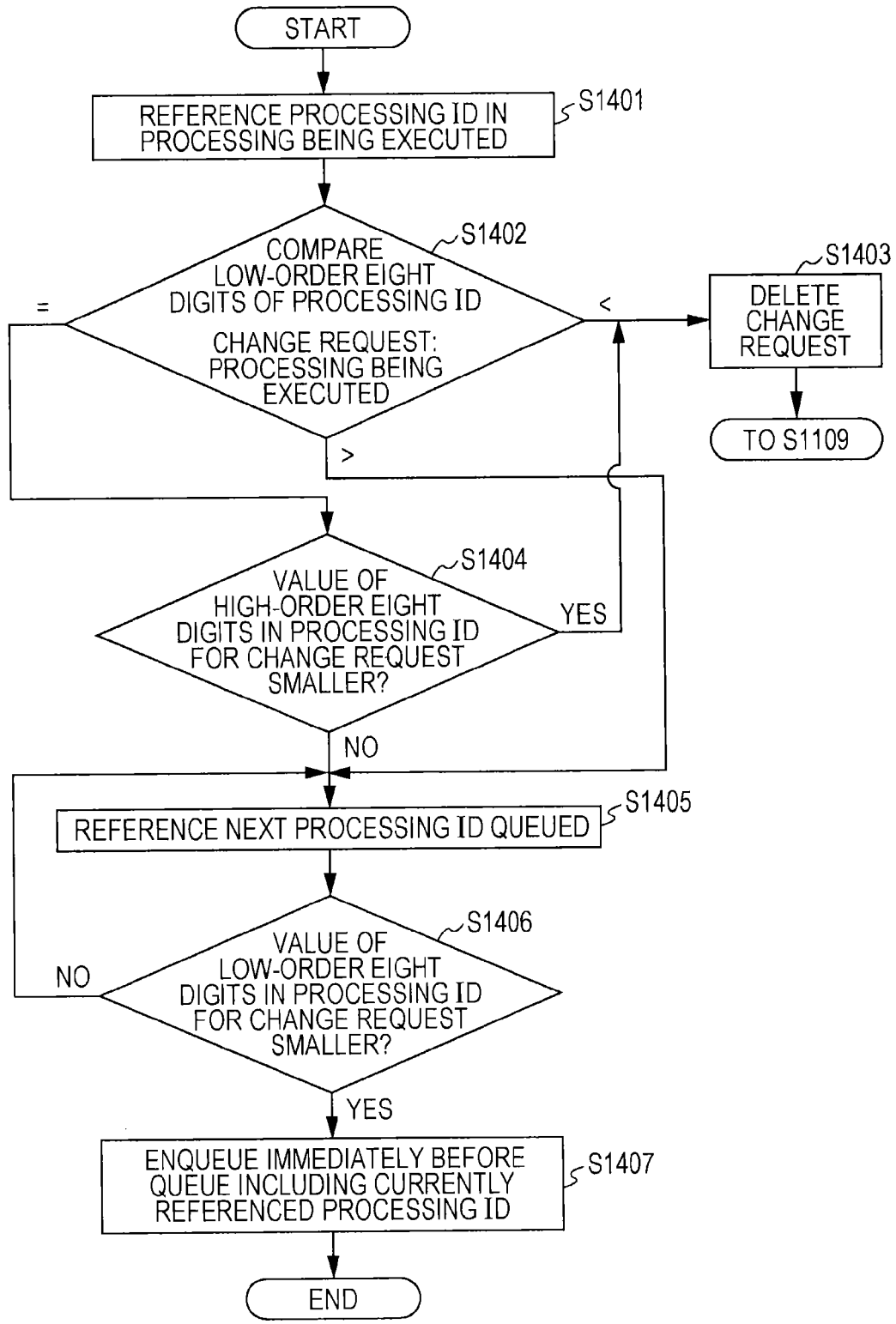
FIG. 14 is a flowchart representing a procedure in enqueue processing that is executed by the source apparatus.

FIG. 14 is a flowchart illustrating a procedure in the enqueue processing executed in step S1107. The enqueue processing executed in step S1107 described above will be described with reference to FIG. 14.

The exclusive processing unit 306 references the processing ID of processing currently being executed by the data update unit 307 (S1401). The exclusive processing unit 306 then compares the processing ID created by the ID creating unit 305 in step S1102 in FIG. 11 with the processing ID in the processing currently being executed (S1402). Specifically, for example, the exclusive processing unit 306 compares the value of the low-order eight digits of the processing ID, which identifies a time of the day at which a change request was received from the information processing apparatus 110 between the processing ID created by the ID creating unit 305 and the processing ID in the processing currently being executed, and determines that the processing ID in which the value of the low-order eight digits is smaller is a processing ID indicating an earlier time of the day.

If it is found as a result of comparison that the value of the low-order eight digits in the processing ID created by the ID creating unit 305 in step S1102 in FIG. 11 is smaller than the value of the low-order eight digits in the processing ID in the processing currently being executed, the exclusive processing unit 306 deletes the change request (queue based on the change request) (S1403).

In this case, the change request received in step S1102 in FIG. 11 was generated before the change request in the processing currently being executed. That is, data intended to be changed in response to the change request received by the transmitting and receiving unit 301 in step S1102 in FIG. 11 is changed by the processing currently being executed to data newer than data after a change made in response to the change request. In this case, the changing of data in response to the change request received by the transmitting and receiving unit 301 in step S1102 in FIG. 11 has no effect, so the exclusive processing unit 306 deletes the change request (queue based on the change request) and terminates the enqueue processing. That is, the exclusive processing unit 306 suppresses processing to change data stored in the data storage unit 311 in response to the change request received by the transmitting and receiving unit 301 in step S1101. In this case, after the enqueue processing has been terminated, the copied-to apparatus executes the processing in step S1109 in FIG. 11.

If it is found as a result of comparison in step S1402 that the value of the low-order eight digits in the processing ID created by the ID creating unit 305 in step S1102 in FIG. 11 is larger than the value of the low-order eight digits in the processing ID in the processing currently being executed, the change request is determined to have been received after the change request for a change currently being processed had been received. In this case, the exclusive processing unit 306 executes processing in step S1405.

If the low-order eight digits in the processing ID created by the ID creating unit 305 in step S1102 in FIG. 11 and the low-order eight digits in the processing ID in the processing currently being executed have the same value, the exclusive processing unit 306 compares the value of the high-order eight digits in the processing ID created by the ID creating unit 305 in step S1102 in FIG. 11 and the value of the high-order eight digits in the processing ID in the processing currently being executed (S1404). If it is found as a result of comparison that the value of the high-order eight digits in the processing ID created by the ID creating unit 305 in step S1102 in FIG. 11 is smaller than the value of the high-order eight digits in the processing ID in the processing currently being executed, the exclusive processing unit 306 deletes the change request (queue based on the change request) (S1403) and terminates the enqueue processing. If the value of the high-order eight digits in the processing ID created by the ID creating unit 305 in step S1102 in FIG. 11 is larger than the value of the high-order eight digits in the processing ID in the processing currently being executed, the exclusive processing unit 306 executes processing in step S1405.

When the value of the high-order eight digits in the processing ID created by the ID creating unit 305 in step S1102 in FIG. 11 is smaller than the value of the high-order eight digits in the processing ID in the processing currently being executed, the exclusive processing unit 306 may execute the processing in step S1405. When the value of the high-order eight digits in the processing ID created by the ID creating unit 305 in step S1102 in FIG. 11 is larger than the value of the high-order eight digits in the processing ID in the processing currently being executed, the exclusive processing unit 306 may delete the change request (queue based on the change request) and may terminate the enqueue processing.

In step S1405, the exclusive processing unit 306 references the processing ID in a queue which is enqueued after the currently referenced queue. The exclusive processing unit 306 then compares the referenced processing ID and the processing ID in the data transmission request packet (S1406). If it is found as a result of comparison that the value of the low-order eight digits in the processing ID created by the ID creating unit 305 in step S1102 in FIG. 11 is smaller than the value of the low-order eight digits in the processing ID in the processing currently being executed, the exclusive processing unit 306 enqueues a queue used in change processing based on the change request received by the transmitting and receiving unit 301 in step S1101 immediately before the referenced queue (S1407).

If the value of the low-order eight digits in the processing ID created by the ID creating unit 305 in step S1102 in FIG. 11 is larger than or equal to the value of the low-order eight digits in the processing ID in the processing currently being executed, the exclusive processing unit 306 executes the processing in step S1405 again. Upon completion of the processing in step S1407, the exclusive processing unit 306 terminates the enqueue processing. After that, the copied-from apparatus waits until the queue that has been enqueued in step S1407 enters an execution state. When the queue enqueued in step S1407 enters the execution state, the data update unit 307 executes the processing in step S1108 in FIG. 11.

Procedure in Processing Executed by the Copied-to Apparatus

Figure 15:
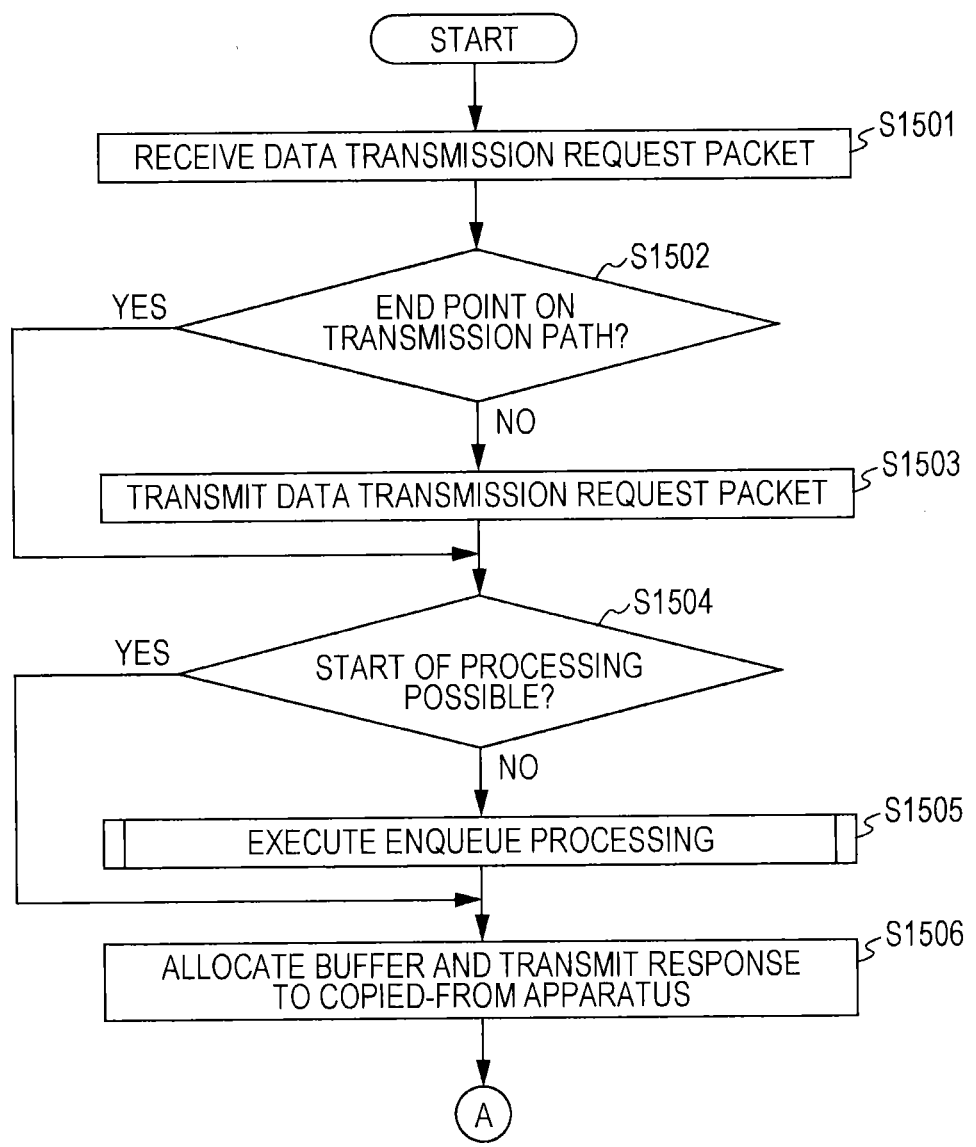
FIG. 15 is a flowchart representing a procedure (one of two) in processing that is executed by the source apparatus.

FIG. 15 is a flowchart illustrating a procedure in processing executed by the copied-to apparatus from when the copied-to apparatus receives a data transmission request packet (S1501) until the copied-to apparatus transmits a response packet to the copied-from apparatus (S1506). A procedure in processing executed by the copied-to apparatus that receives a data transmission request from the copied-from apparatus will be described.

First, the transmitting and receiving unit 301 in the copied-to apparatus receives a data transmission request packet source the copied-from apparatus (S1501).

Then, the data update unit 307 in the copied-to apparatus references transmission path information included in the data transmission request packet received by the transmitting and receiving unit 301 in step S1501 and determines whether the copied-to apparatus is at the end point of the transmission path (S1502). The end point will be described below. As for transmission path 1 described above, the storage apparatus 102 is not at the end point of the transmission path, but the storage apparatus 101 is at the end point. If the copied-to apparatus is determined not to be at the end point, the data update unit 307 executes processing in step S1503. If the copied-to apparatus is determined to be at the end point, the exclusive processing unit 306 executes processing in step S1504.

In step S1503, the data update unit 307 transmits a data transmission request packet, which is used to reflect a change in data, through the transmitting and receiving unit 301 to a copied-to apparatus located one place ahead of the copied-to apparatus of interest on the transmission path, according to the transmission path information referenced in step S1502. If, for example, the transmission path information referenced in step S1502 is transmission path information indicating transmission path 1 described above and the copied-to apparatus of interest is the storage apparatus 102, the data update unit 307 transmits a data transmission request packet through the transmitting and receiving unit 301 to the storage apparatus 101. After the data transmission request packet has been transmitted, the exclusive processing unit 306 executes the processing in step S1504.

In step S1504, the exclusive processing unit 306 determines whether the copied-to apparatus of interest is capable of starting processing to change data in response to the data transmission request packet received by the transmitting and receiving unit 301 in step S1501. To determine whether the copied-to apparatus of interest is capable of starting the processing to change data, it is determined, for example, whether the address of the data included in the data transmission request packet is currently being accessed. If an access is not detected, this indicates that duplicate processing on the data is not being executed, so the copied-to apparatus of interest is determined to be capable of staring processing.

If the exclusive processing unit 306 determines that processing to change the data is possible, the exclusive processing unit 306 executes the processing in step S1506. If the exclusive processing unit 306 determines that processing to change the data is not possible, the exclusive processing unit 306 executes enqueue processing in step S1505. The processing in step S1505 will be described later.

After the exclusive processing unit 306 has executed the enqueue processing in step S1505, the queue based on the data transmission request packet shifts to the execution state. Then, the data update unit 307 allocates, in the memory 203, a buffer used to receive data, after which the transmitting and receiving unit 301 transmits a response packet to the copied-from apparatus to notify it that the data may be changed (S1506).

Figure 16:
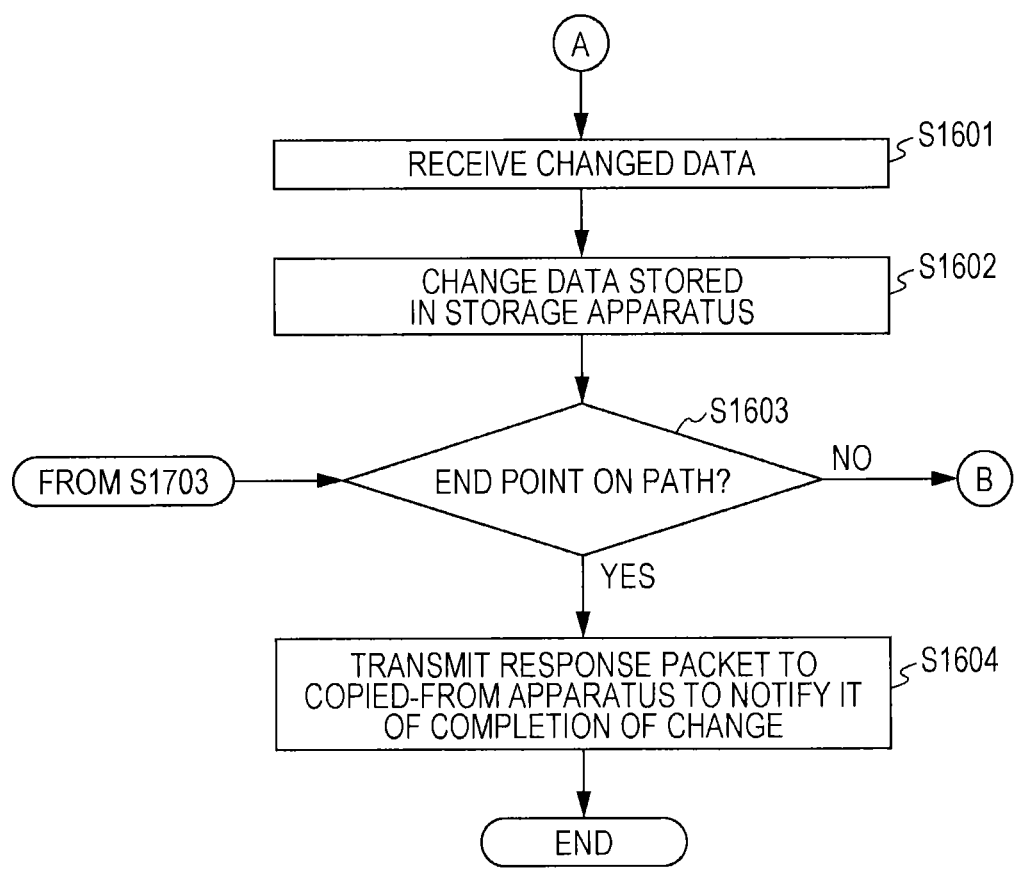
FIG. 16 is a flowchart representing a procedure (two of two) in processing that is executed by the source apparatus.

After the processing in step S1506 has been executed, processing by the copied-to apparatus shifts from the terminal A in FIG. 15 to the terminal A in FIG. 16.

FIG. 16 is a flowchart illustrating a procedure in processing executed by the copied-to apparatus from when the copied-to apparatus receives changed data (S1601) until the copied-to apparatus transmits a response packet that indicates completion of the change to the copied-from apparatus (S1604).

After the data update unit 307 has been destination the copied-from apparatus, a response packet indicating that processing to change the data is possible in step S1506 in FIG. 15, the transmitting and receiving unit 301 receives the changed data source the copied-from apparatus and stores the received data in the buffer allocated in step S1506 in FIG. 15 (S1601).

The data update unit 307 then changes the data stored in the data storage unit 311 in the copied-to apparatus to the changed data stored in the buffer by transmitting and receiving unit 301 in step S1601, according to the information included in the data transmission request packet received by the transmitting and receiving unit 301 in step S1201 in FIG. 13 (S1602). After the data has been changed, the data update unit 307 determines whether the copied-to apparatus is at the end point of the transmission path (S1603). The method of making this determination is similar to the method in step S1502. Accordingly, for example, the determination result obtained in step S1502 may be held in the memory 203 and the stored result may be used to make a determination in step S1603 as in step S1502.

If the copied-to apparatus is determined not to be at the end point of the transmission path in step S1603, the procedure in the processing proceeds from the terminal B in FIG. 16 to the terminal B in FIG. 11, after which the copied-to apparatus executes processing that starts from step S1106 in FIG. 11. Specifically, the copied-to apparatus now functions as a copied-from apparatus and transmits a data transmission request packet, information that is used to change the data, and the like. If the copied-to apparatus is determined to be at the end point of the transmission path, the data update unit 307 in the copied-to apparatus transmits a response packet through the transmitting and receiving unit 301 to the copied-from apparatus to notify it that the data has been changed and terminates the processing (S1604).

Enqueue Processing

Figure 17:
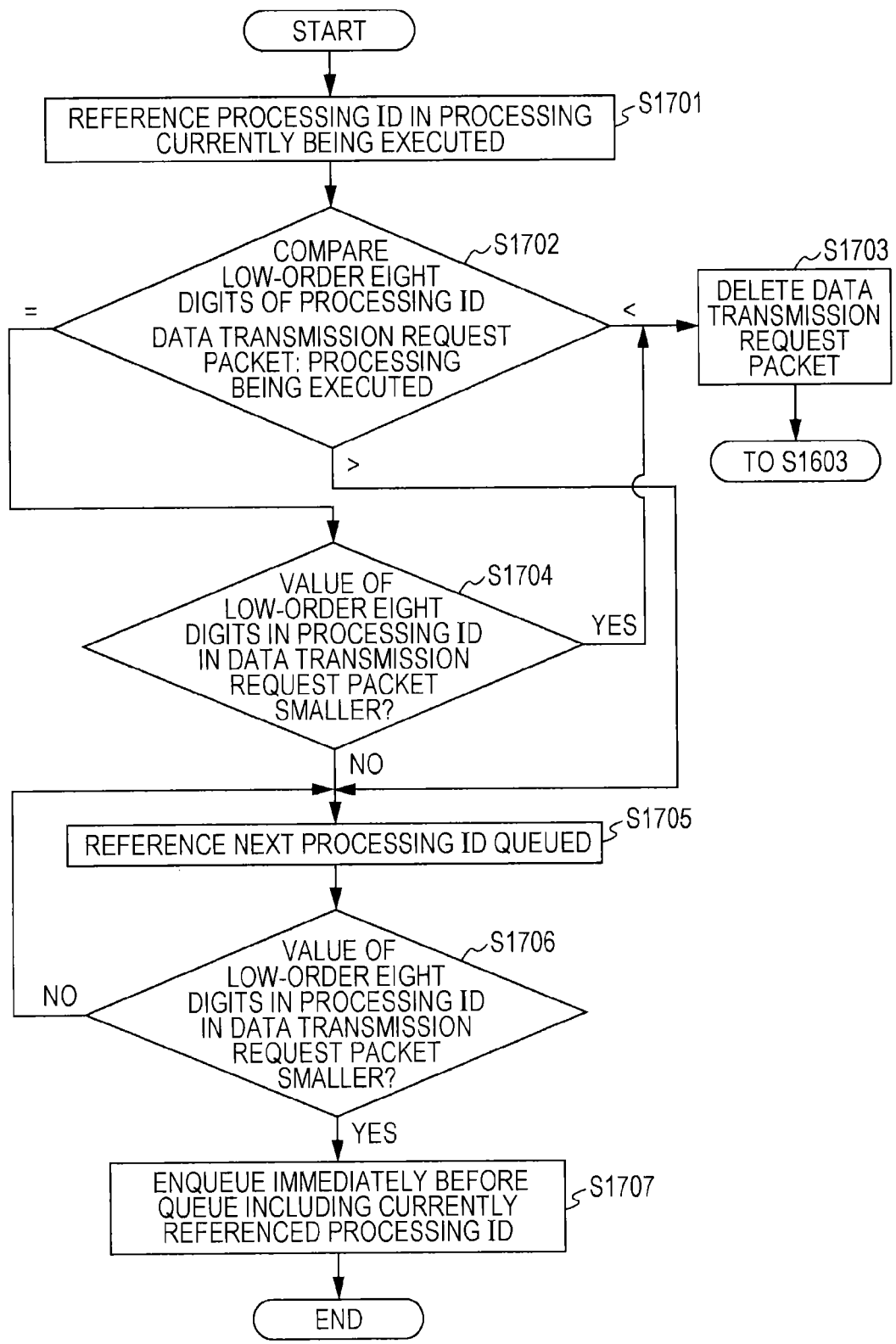
FIG. 17 is a flowchart representing a procedure in processing that is executed by the destination apparatus.
Figure 18:
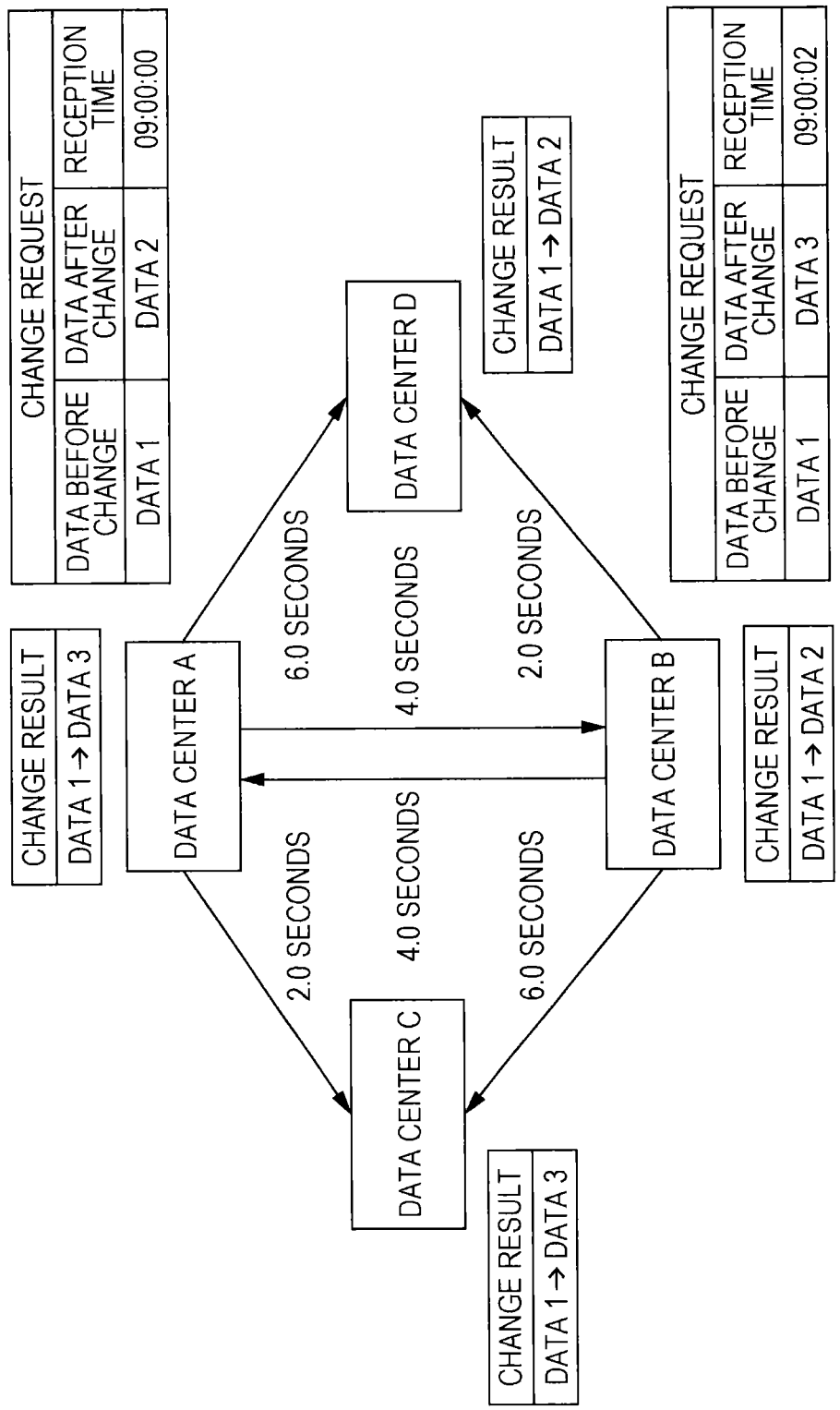
FIG. 18 illustrates a conventional technology.

FIG. 17 is a flowchart representing a procedure in processing that is executed by the copied-to apparatus in step S1505. The enqueue processing executed in step S1505 described above will be described with reference to FIG. 17.

The exclusive processing unit 306 references the processing ID of processing currently being executed by the data update unit 307 (S1701). The exclusive processing unit 306 then compares the processing ID included in the data transmission request packet received by the transmitting and receiving unit 301 in step S1501 in FIG. 15 with the processing ID in the processing currently being executed (S1702). Specifically, for example, the exclusive processing unit 306 compares the value of the low-order eight digits of the processing ID, which identifies a time of the day at which a change request was received from the information processing apparatus 110 between the processing ID included in the received data transmission request packet and the processing ID in the processing currently being executed, and determines that the processing ID in which the value of the low-order eight digits is smaller is a processing ID indicating an earlier time of the day.

If it is found as a result of comparison that the time of the day identified by the processing ID included in the data transmission request packet received by the transmitting and receiving unit 301 in step S1501 is earlier than the time of the day identified by the processing ID in the processing currently being executed, the exclusive processing unit 306 deletes the data transmission request packet (queue based on the data transmission request packet) (S1703).

In this case, it is determined that the change request corresponding to the data transmission request packet received by the transmitting and receiving unit 301 in step S1501 was received before the change request that requested the change currently being processed was received. That is, in the processing currently being executed, the data to be handled in response to the data transmission request packet received by the transmitting and receiving unit 301 in step S1501 in FIG. 15 is changed to data that is newer than the data changed in response to the data transmission request packet.

In this case, the data changed in response to the data transmission request packet received by the transmitting and receiving unit 301 in step S1501 has no effect, so the exclusive processing unit 306 deletes the data transmission request packet (queue based on the data transmission request packet) and terminates the enqueue processing. In other words, the exclusive processing unit 306 suppresses the processing to change data stored in the data storage unit 311 in response to the change request received by the transmitting and receiving unit 301 in step S1501 in FIG. 15. If the processing to change data stored in the data storage unit 311 is suppressed, upon completion of the enqueue processing, the data update unit 307 in the copied-to apparatus executes the processing in S1603 in FIG. 16.

If it is found as a result of comparison in step S1702 that the time of the day identified by the processing ID included in the data transmission request packet received by the transmitting and receiving unit 301 in step S1501 is later than the time of the day indentified by the processing ID in the processing currently being executed, the exclusive processing unit 306 determines that the change request corresponding to the data transmission request packet received by the transmitting and receiving unit 301 in step S1501 in FIG. 15 was received after the change request corresponding to the change currently being processed had been received. In this case, the exclusive processing unit 306 executes processing in step S1705.

If the low-order eight digits in the processing ID included in the data transmission request packet received by the transmitting and receiving unit 301 in step S1501 in FIG. 15 and the low-order eight digits in the processing ID in the processing currently being executed have the same value, the exclusive processing unit 306 executes processing in step S1704.

Specifically, the exclusive processing unit 306 compares the value of the high-order eight digits in the processing ID included in the data transmission request packet received by the transmitting and receiving unit 301 in step S1501 in FIG. 15 and the value of the high-order eight digits in the processing ID in the processing currently being executed.

If it is found as a result of comparison that the value of the high-order eight digits in the processing ID included in the data transmission request packet received by the transmitting and receiving unit 301 in step S1501 in FIG. 15 is smaller than the value of the high-order eight digits in the processing ID in the processing currently being executed, the exclusive processing unit 306 deletes the data transmission request packet (queue based on the data transmission request packet) (S1703). If the value of the high-order eight digits in the processing ID included in the data transmission request packet received by the transmitting and receiving unit 301 in step S1501 in FIG. 15 is larger than the value of the high-order eight digits in the processing ID in the processing currently being executed, the exclusive processing unit 306 executes the processing in step S1705.

When the value of the high-order eight digits in the processing ID included in the data transmission request packet received by the transmitting and receiving unit 301 in step S1501 in FIG. 15 is smaller than the value of the high-order eight digits in the processing ID in the processing currently being executed, the exclusive processing unit 306 may execute the processing in step S1705. When the value of the high-order eight digits in the processing ID included in the data transmission request packet received by the transmitting and receiving unit 301 in step S1501 in FIG. 15 is larger than the value of the high-order eight digits in the processing ID in the processing currently being executed, the exclusive processing unit 306 may delete the data transmission request packet (queue based on the data transmission request packet).

In step S1705, the exclusive processing unit 306 references the processing ID, in a queue, which is enqueued after the currently referenced queue. The exclusive processing unit 306 then compares the referenced processing ID and the processing ID in the data transmission request packet (S1706). If it is found as a result of comparison that the value of the low-order eight digits in the processing ID included in the data transmission request packet received by the transmitting and receiving unit 301 in step S1501 in FIG. 15 is smaller than the value of the low-order eight digits in the processing ID in the processing currently being executed, the exclusive processing unit 306 enqueues a queue in change processing based on the change request received by the transmitting and receiving unit 301 in step S1501 immediately before the referenced queue (S1707).

If it is found as a result of comparison in step S1706 that the value of the low-order eight digits in the processing ID included in the data transmission request packet received by the transmitting and receiving unit 301 in step S1501 in FIG. 15 is larger than or equal to the value of the low-order eight digits in the processing ID in the processing currently being executed, the exclusive processing unit 306 executes the processing in step S1705 again. Upon completion of the processing in step S1707, the exclusive processing unit 306 terminates the enqueue processing. After that, the exclusive processing unit 306 waits until the queue that has been enqueued in step S1707 enters an execution state. When the queue enqueued in step S1707 enters the execution state, the data update unit 307 executes the processing in step S1506 in FIG. 15.

By the procedure described above, a change request received by the copied-from apparatus is destination another storage apparatus (another copied-to apparatus) so that data is synchronized.

According to this embodiment, when any one of the storage apparatuses 101 to 105 receives a data change request, the storage apparatus that has received the data change request creates information that identifies the time of the day at which the storage apparatus received the data change request, incorporates the created information, which identifies the time of the reception of the data change request, into a data transmission request (data transmission request packet), and transmits the data transmission request packet to other storage apparatuses.

When the other storage apparatuses (storage apparatuses 101 to 105 excluding the storage apparatus that has transmitted the data transmission request packet) receive the data transmission request packet, the other storage apparatuses changes the data according to the information that identifies the time of the day. Then, for example, even if there is a mismatch in an order between a change request and a data transmission request packet, it is possible to synchronize data stored in the storage apparatuses 101 to 105 without a data inconsistency.

In this embodiment, when data is destination another storage apparatus included in the same group, the transmission path that has the shortest response time is selected for data transmission, enabling data transmission efficiency to be improved.

The programs, which are executed by CPU, are able to be stored in a computer-readable non-transitory medium.

This embodiment is only an example of an aspect that embodies the present disclosure. The present disclosure is not limited to the aspect that has been described by using an embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A control method executed by a first storage control apparatus, connected to an information processing apparatus so as to be mutually communicate, that transmits data to a second storage control apparatus for data synchronization with the first storage control apparatus, the method comprising:
   receiving, from the information processing apparatus, a request to change data stored in a storage unit provided in the first storage control apparatus so as to be synchronized to changed data;
   extracting address information, included in the request, that identifies an address at which data corresponding to the data to be synchronized has been stored in a storage unit provided in the second storage control apparatus;
   creating time information that identifies a time of the day at which the request was received; and
   transmitting a change request, which includes the extracted address information and the created time information, from the first storage control apparatus to the second storage control apparatus, the change request requesting the corresponding data stored in the second storage control apparatus to be changed to the changed data.

2. The control method according to claim 1, the method further comprising:
   upon receipt of a response, from the second storage control apparatus, that indicates that changing of the corresponding data in response to a change request from an other storage control apparatus is not being executed, changing the data, which is synchronized and stored in the storage unit provided in the first storage control apparatus, to the changed data; and
   transmitting the changed data to the second storage control apparatus.

3. The control method according to claim 2, the method further comprising:
   transmitting measurement data from the first storage control apparatus to the second storage control apparatus in a case that the changed data and the change request are transmittable from the first storage control apparatus to the second storage control apparatus through a plurality of paths;
   measuring response times until receiving a response, indicating that the transmitted measurement data has been received, from the second storage control apparatus; and
   determining a path that takes the shortest response time among the measured response times as a path through which to transmit the changed data that has been changed in response to the request and the change request to the second storage control apparatus.

4. The control method according to claim 2, wherein the change request further includes path information that identifies a path through which to transmit the changed data and the change request from the first storage control apparatus to the second storage control apparatus.

5. A control method executed by a second storage control apparatus, that receives data from a first storage control apparatus for data synchronization with the first storage control apparatus connected to an information processing apparatus so as to be mutually communicate, the method comprising:
   receiving a change request, which includes time information and address information, from the first storage control apparatus, the time information identifying a time of the day at which the first storage control apparatus received a request to change data to be synchronized from the information processing apparatus, the address information identifying an address at which data corresponding to the data to be synchronized has been stored in a storage unit provided in the second storage control apparatus, the change request requesting the corresponding data to be changed to changed data; and
   suppressing the corresponding data, which has been stored in the storage unit and is identified by the address information, from being changed to the changed data when processing on the corresponding data is being executed and a time of the day at which a request that requests the processing to be carried out is later than the time of the day identified by the time information.

6. The control method according to claim 5, wherein the second storage control apparatus is further connected to an other storage control apparatus that transmits and receives data to and from the first storage control apparatus and the second storage control apparatus for data synchronization with the first storage control apparatus and the second storage control apparatus;
   the change request further includes path information that identifies a path through which to transmit the change request from the first storage control apparatus to the other storage control apparatus; and the method further includes transmitting the change request from the first storage control apparatus to the other storage control apparatus through the path identified by the path information.

7. A first storage control apparatus that transmits data to a second storage control apparatus for data synchronization with the second storage control apparatus, the first storage control apparatus comprising:

a storage that stores data to be synchronized;

a receiver that receives, from an information processing apparatus, a request to change the data to be synchronized stored in the storage to changed data;

one or more hardware processors configured to:

extract address information, included in the request, that identifies an address at which data corresponding to the data to be synchronized has been stored in a storage provided in the second storage control apparatus;

create time information that identifies a time of the day at which the request was received; and a transmitter configured to transmit a change request, which includes the extracted address information and the created time information, to the second storage control apparatus, the change request requesting the corresponding data stored in the second storage control apparatus to be changed to the changed data.

8. The first storage control apparatus according to claim 7, wherein the one or more hardware processors are further configured to:

change the data, which is synchronized and stored in the storage provided in the first storage control apparatus, to the changed data upon receipt of a response, from the second storage control apparatus, that indicates that changing of the corresponding data in response to a change request from an other storage control apparatus is not being executed, and the transmitter transmits the changed data to the second storage control apparatus.

9. The first storage control apparatus according to claim 8, wherein the transmitter is configured to transmit measurement data from the first storage control apparatus to the second storage control apparatus when the changed data and the change request are transmittable from the first storage control apparatus to the second storage control apparatus through a plurality of paths, and the one or more hardware processors are further configured to:

measure response times until receiving a response, indicating that the transmitted measurement data has been received, from the second storage control apparatus; and determine a path that takes the shortest response time among the measured response times as a path through which to transmit the changed data that has been changed in response to the request and the change request to the second storage control apparatus.

10. The first storage control apparatus according to claim 8, wherein the change request further includes path information that identifies a path through which to transmit the changed data and the change request from the first storage control apparatus to the second storage control apparatus.

11. A second storage control apparatus, that receives data from a first storage control apparatus for data synchronization with the first storage control apparatus connected to an information processing apparatus so as to be mutually communicate, the second storage control apparatus comprising:

a storage configured to store data corresponding to data stored in a storage in the first storage control apparatus so as to be synchronized; and a controller including a CPU and a memory and configured to:

receive a change request, which includes time information and address information, from the first storage control apparatus, the time information identifying a time of the day at which the first storage control apparatus received a request to change data to be synchronized from the information processing apparatus, the address information identifying an address at which the corresponding data has been stored in the storage, the change request requesting the corresponding data to be changed to changed data; and suppress the corresponding data, which has been stored in the storage and is identified by the address information, from being changed to the changed data when processing on the corresponding data is being executed and a time of the day at which a request that requests the processing to be carried out is later than the time of the day identified by the time information.

12. The second storage control apparatus according to claim 11, wherein when a processing of the corresponding data identified by the address information of the change request received from the first storage control apparatus is being executed and the time of the day identified by the time information of the change request received from the first storage control apparatus is later than a time of day identified by time information of the corresponding data, the controller enqueues the change request received from the first storage control apparatus.

* * * * *